(12) United States Patent  
Schall et al.

(10) Patent No.: US 6,676,189 B2
(45) Date of Patent: Jan. 13, 2004

(54) COVER ASSEMBLY FOR A VEHICLE BED

(75) Inventors: Michael G. Schall, Lenox, MI (US); Thomas Murray, Columbiaville, MI (US); Anthony E. Michon, West Bloomfield, MI (US); Michael J. McIsaac, Chesterfield, MI (US); Thomas J. Mack, Highland, MI (US); Daniel G. Beohmer, Krailling (DE)

(73) Assignee: Webasto Sunroofs, Inc., Rochester Hills, MI (US)

( * ) Notice: Subject to any disclaimer, the term of this patent is extended or adjusted under 35 U.S.C. 154(b) by 0 days.

(21) Appl. No.: 10/058,211

(22) Filed: Jan. 29, 2002

(65) Prior Publication Data

US 2002/0113456 A1 Aug. 22, 2002

Related U.S. Application Data

(60) Provisional application No. 60/264,324, filed on Jan. 29, 2001.

(51) Int. Cl.[7] .................................................. B60P 7/04
(52) U.S. Cl. .......................... 296/100.12; 296/100.15; 296/100.16
(58) Field of Search ....................... 296/100.11, 100.12, 296/100.15, 105, 100.16, 100.17, 100.18

(56) References Cited

U.S. PATENT DOCUMENTS

| 3,820,840 | A | * | 6/1974 | Forsberg ................ 296/100.12 |
| 3,861,737 | A |   | 1/1975 | Kirkbride |
| 3,901,548 | A |   | 8/1975 | Seaman, Jr. |
| 3,923,334 | A |   | 12/1975 | Key |
| 4,210,361 | A |   | 7/1980 | Marvin et al. |
| 4,215,897 | A | * | 8/1980 | Aiken et al. .......... 296/100.11 |
| 4,273,377 | A |   | 6/1981 | Alexander |
| 4,285,539 | A |   | 8/1981 | Cole |
| 4,289,346 | A |   | 9/1981 | Bourgeois |
| 4,342,480 | A |   | 8/1982 | Ross, Jr. |
| 4,518,194 | A |   | 5/1985 | Kirkham et al. |
| 4,547,014 | A | * | 10/1985 | Wicker .................. 296/100.12 |
| 4,563,034 | A |   | 1/1986 | Lamb |
| 4,611,848 | A |   | 9/1986 | Romano |
| 4,717,196 | A |   | 1/1988 | Adams |
| 4,756,325 | A |   | 7/1988 | Daniels |
| 4,789,196 | A |   | 12/1988 | Fields |
| 4,795,206 | A |   | 1/1989 | Adams |
| 4,889,381 | A |   | 12/1989 | Tamblyn et al. |
| 5,174,625 | A |   | 12/1992 | Gothier et al. |
| 5,205,605 | A |   | 4/1993 | Haddad, Jr. |
| 5,338,084 | A |   | 8/1994 | Wardell |
| 5,427,428 | A |   | 6/1995 | Ericson et al. |

(List continued on next page.)

FOREIGN PATENT DOCUMENTS

| NL | 8902 467 | 10/1989 |
| NL | 9002 117 | 9/1990 |
| WO | WO94/01299 | 1/1994 |

Primary Examiner—Joseph D. Pape
(74) Attorney, Agent, or Firm—Pillsbury Winthrop LLP

(57) ABSTRACT

A cover assembly for a vehicle bed includes track members, support members, a flexible cover, and a reversible motor. The support members are movably arranged on the track members such that (1) movement of a distal one of the support members in the opening or closing direction causes the distal support member to push or pull each of the other support members in a sequential manner in the opening or closing direction. A drive cable is engaged with a gear operatively connected to the motor in intermeshed relation such that (a) rotation of the gear by the motor in a first rotational direction pushes the cable in a distal direction to push the distal support member in the closing direction and (b) rotation of the gear in a second rotation direction pulls the cable in a proximal direction to pull the distal support member in the opening direction.

51 Claims, 35 Drawing Sheets

U.S. PATENT DOCUMENTS

| | | | |
|---|---|---|---|
| 5,429,408 A | * 7/1995 | Henning et al. ....... 296/100.12 |
| 5,443,295 A | 8/1995 | Moberly |
| 5,524,953 A | 6/1996 | Shaer |
| 5,540,475 A | 7/1996 | Kersting et al. |
| 5,542,733 A | 8/1996 | Kintz |
| 6,030,021 A | 2/2000 | Ronai |
| 6,152,517 A | 11/2000 | Steadman |
| 6,321,819 B1 | 11/2001 | Copp et al. |
| 6,422,635 B1 | 7/2002 | Steffens et al. |
| 6,427,500 B1 | 8/2002 | Weinerman et al. |
| 2001/0035664 A1 | 11/2001 | Steffens et al. |

* cited by examiner

COVER ASSEMBLY FOR A VEHICLE BED

The present application claims priority to U.S. Provisional Application of Schall et al., Ser. No. 60/264,324, filed Jan. 29, 2001 the entirety of which is hereby incorporated into the present application by reference.

FIELD OF THE INVENTION

The present invention relates to a cover assembly for a vehicle bed. More particularly, the present invention relates to a cover assembly for a vehicle bed that is selectively moveable along the vehicle bed.

BACKGROUND OF THE INVENTION

Cover assemblies for vehicle beds are well known in the art. Examples of cover assemblies are shown in U.S. Pat. Nos. 4,563,034, 4,289,346, and 4,285,539.

The present invention provides improvements over known cover assemblies.

SUMMARY OF THE INVENTION

One aspect of the invention relates to an improved mechanism for controlling movement of the cover. This aspect of the invention provides a cover assembly for a vehicle bed having front and rear end walls, first and second side walls between the front and rear end walls, and a floor. The first and second side walls, the front and rear end walls, and the floor define an interior space therebetween. The cover assembly includes first and second elongated track members, a plurality of transverse support members, a flexible cover, and a reversible motor.

The first track member is mountable to the first side wall and the second track member is mountable to the second side wall. Each of the plurality of support members have first and second end portions. The first end portions are mountable on the first track member and the second end portions are mountable on the second track member to enable the support members to be moved in opposing opening and closing directions along the first and second track members, respectively. The flexible cover is secured to each of the plurality of transverse support members. The support members are movably arranged on the first and second track members such that (1) movement of a distal one of the support members in the opening direction causes the distal support member to push each of the other support members in a sequential manner in the opening direction and hence sequentially collapses the cover secured thereto, thereby facilitating access to the interior space of the vehicle bed, and (2) movement of the distal support member in the closing direction causes the distal support member to pull the other support members in a sequential manner in the closing direction and hence sequentially moves the cover secured thereto into covering relation to the interior space of the vehicle bed, thereby inhibiting access to the interior space of the vehicle bed.

A gear is operatively connected to the motor, the motor being activatable to rotate the gear in opposing rotational directions. A drive cable conduit extends longitudinally along the first elongated track member. The drive cable conduit has a longitudinally extending slot. A flexible drive cable is received within the conduit and has a distal end portion connected to the distal one of the support members through the longitudinally extending slot to enable movement of the cable within the conduit to move the distal support member in the opening and closing directions. The cable is engaged with the gear in intermeshed relation such that (a) rotation of the gear by the motor in a first rotational direction pushes the cable in a distal direction within the conduit to push the distal support member in the closing direction and (b) rotation of the gear in a second rotation direction pulls the cable in a proximal direction within the conduit to pull the distal support member in the opening direction.

Another aspect of the invention relates to an improvement for providing more orderly folding of the cover assembly's flexible cover. In this aspect of the invention, the cover assembly includes a plurality of fold initiating mechanisms mounted between each pair of adjacent support members. Each of the fold initiating mechanisms has a portion that engages an adjacent portion of the cover between an associated pair of adjacent support members so as to initiate folding of the adjacent portion in a predetermined direction as one of the associated pair of adjacent support members is being moved towards the other of the associated pair in the opening direction.

Yet another aspect of the invention relates to an improvement for compensating for any stretching out of the flexible cover over time, which causes the cover to lose tension. In this aspect of the invention, the cover assembly includes a cover tensioner secured to a proximal end of the cover opposite the distal support member. The cover tensioner includes a biasing member constructed and arranged to apply a tensioning force to the cover in a direction away from the distal support member to thereby maintain tension in the cover.

Still another aspect of the invention relates to an improvement for retaining the cover in tension when the cover is in the fully closed position. In this aspect of the invention, the distal support member is adjacent the rear end wall when the cover is in a fully closed position. The distal support member provides a load transmitting surface and the first and second track members providing a load bearing surface that is engagable with the load transmitting surface. The load bearing and transmitting surfaces are positioned and configured such that when the distal support member is in the fully closed position the load transmitting surface engages the load bearing surface so that a tension force applied in the opening direction to the distal support member by the cover is transmitted to and borne by the load bearing surfaces of the track members thereby preventing the distal support member from movement in the opening direction.

Other objects, features, and advantages of this invention will become apparent from the following detailed description when taken in conjunction with the accompanying drawings, which are a part of this disclosure and which illustrate, by way of example, the principles of this invention.

BRIEF DESCRIPTION OF THE DRAWINGS

The accompanying drawings facilitate an understanding of the various embodiments of this invention. In such drawings.

DETAILED DESCRIPTION OF PREFERRED EMBODIMENTS

Figure 1:
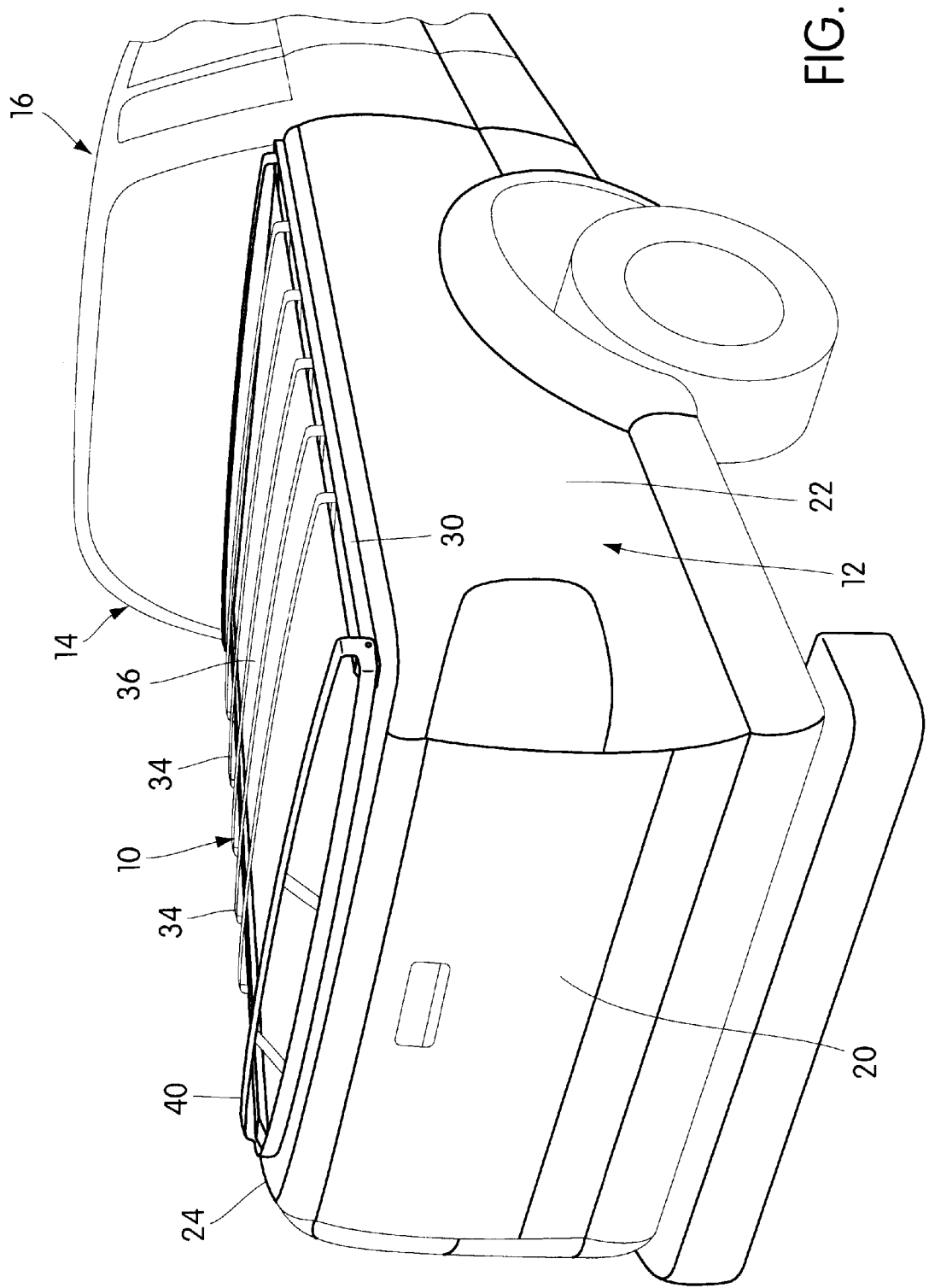
FIG. 1 is a perspective view of a cover assembly for a vehicle bed constructed according to an embodiment of the present invention, the cover assembly being installed on a vehicle bed.
Figure 2:
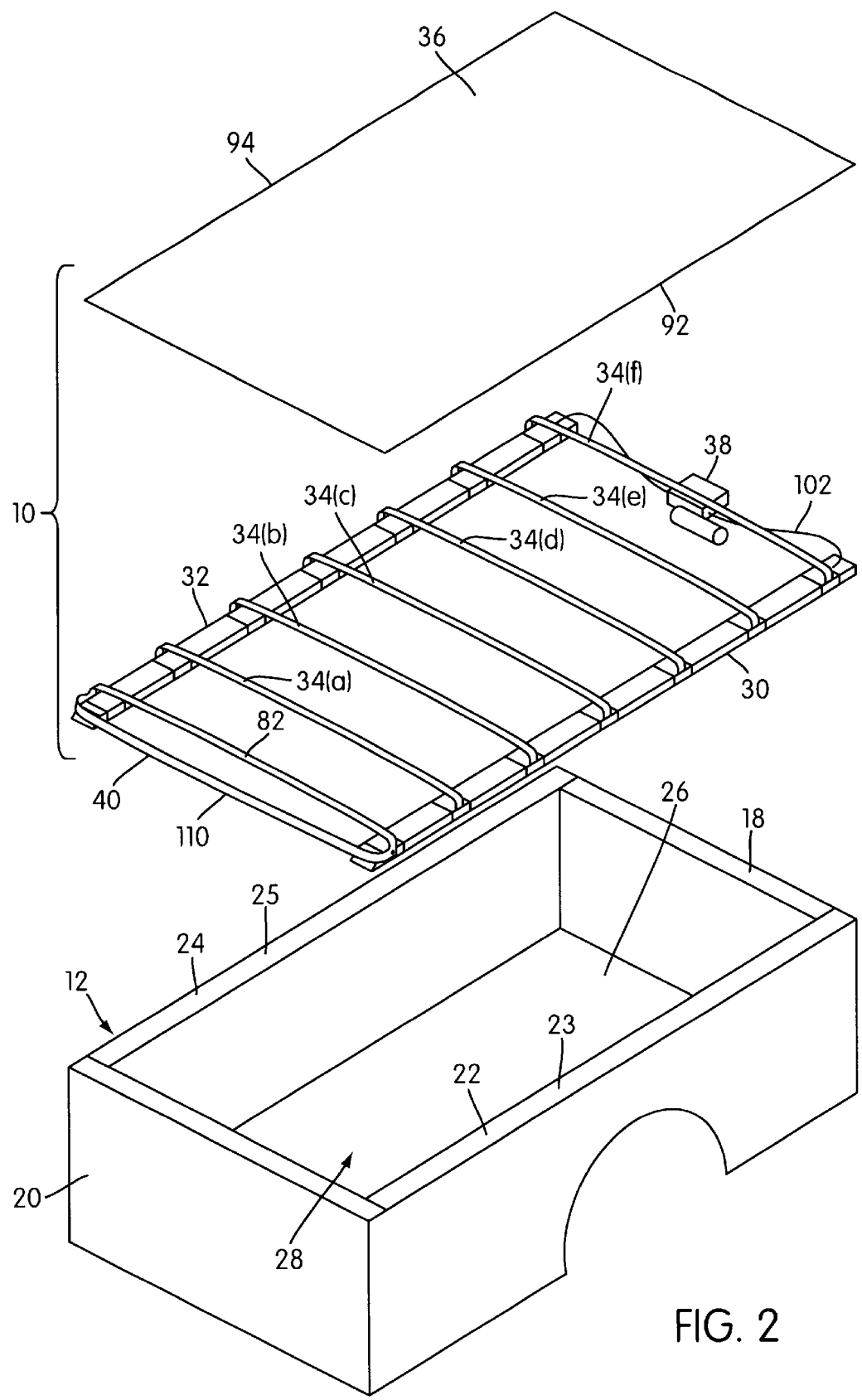
FIG. 2 is a partial exploded perspective view of the cover assembly and vehicle bed of FIG. 1
Figure 3:
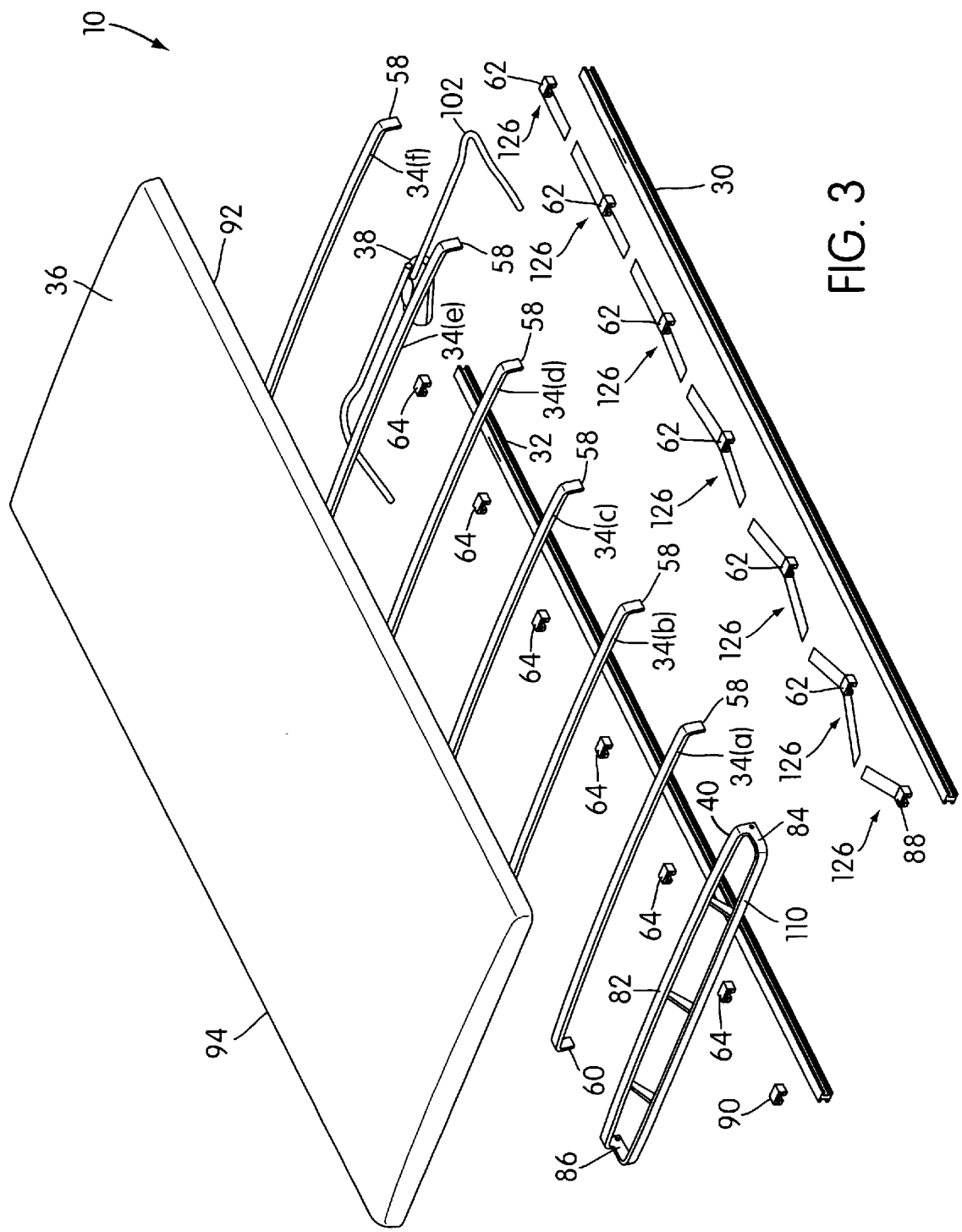
FIG. 3 is an exploded perspective view of the cover assembly of FIG. 1.

FIGS. 1–3 show a cover assembly 10 for a vehicle bed 12 constructed according to an exemplary embodiment of the present invention. The vehicle bed 12 is mounted rearwardly of a vehicle cab 14 of a vehicle 16. As is conventional, the vehicle cab 14 is designed to accommodate passengers, including a driver, and has the various controls for operating the vehicle 16. In the embodiment shown, the vehicle is a pick-up truck with the vehicle bed 12, or truck bed, having front and rear end walls 18, 20, first and second side walls 22, 24 extending perpendicularly between the front and rear end walls 18, 20, and a floor 26. The first and second side walls 22, 24, the front and rear end walls 18, 20, and the floor 26 define an interior space 28 therebetween for transporting objects. The rear end wall 20 may be a pivotally mounted tailgate for facilitating loading and unloading of the truck bed 12, or it may be fixedly secured in position. It is also contemplated that the front end wall 18 may be a rear wall of the vehicle cab 14.

The cover assembly 10 comprises first and second elongated track members 30, 32, a plurality of transverse support members 34, a flexible cover 36, and a motor 38. The plurality of transverse support members 34 includes a distal support member 40, as will be further discussed below.

Figure 5:
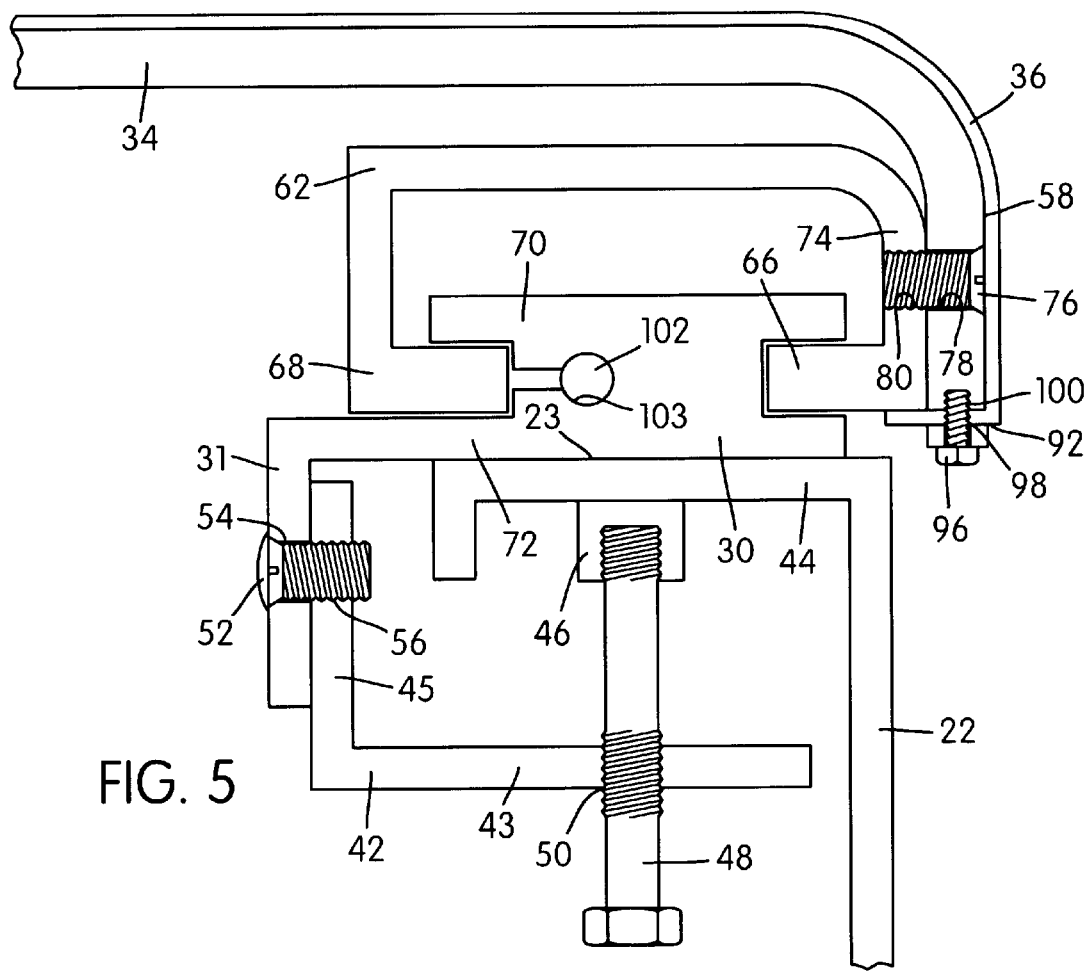
FIG. 5 is a cross-sectional view illustrating the mounting of the track member to a side wall of the vehicle bed and the interconnection of the components of the cover assembly.

The first track member 30 is mountable to the first side wall 22 and the second track member 32 is mountable to the second side wall 24. In the illustrated embodiment, the first and second track members 30, 32 are mounted to upper surfaces 23, 25 of respective first and second side walls 22, 24 by a plurality of clamps 42. FIG. 5 illustrates a clamp 42 mounting the first track member 30 to the first side wall 22. The second track member 32 is mounted to the second side wall 24 in a similar manner. As shown in FIG. 5, the clamp 42 is generally L-shaped with one leg 43 secured to a flange portion 44 of the first side wall 22 and the other leg 45 secured to a downwardly extending portion 31 of the first track member 30. Specifically, the flange portion 44 includes a screw block 46 mounted thereto by welding, for example. The screw block 46 is mounted to a screw pin 48 and provides tension when tightened to flange portion 44 upon threading of screw pin 48 to screw block 46 and to threaded hole or slot 50 in the one leg 43 of the clamp 42. The other leg 45 and downwardly facing portion 31 are positioned adjacent one another and are secured by a fastener, such as a screw 52, that extends through threaded slots 54, 56 in the downwardly extending portion 31 and the other leg 45 respectively.

The first and second track members 30, 32 may be removably mounted to the first and second side walls 22, 24 by any other suitable method, such as bolts extending through the flange portion 44 and directly into cooperating threaded holes in the first and second track members 30, 32. Likewise, the first and second track members 30, 32 may be fixedly mounted to the first and second side walls 22, 24 by welding or riveting, for example.

In the illustrated embodiment, the first and second track members 30, 32 are constructed and arranged to slidably mount each of the plurality of support members 34. Each of the plurality of transverse support members 34 have first and second end portions 58, 60. The first end portions 58 are mountable on the first track member 30 and the second end portions 60 are mountable on the second track member 32 to enable the support members 34 to be moved in opposing, opening and closing directions along the first and second track members 30, 32, respectively.

Figure 4:
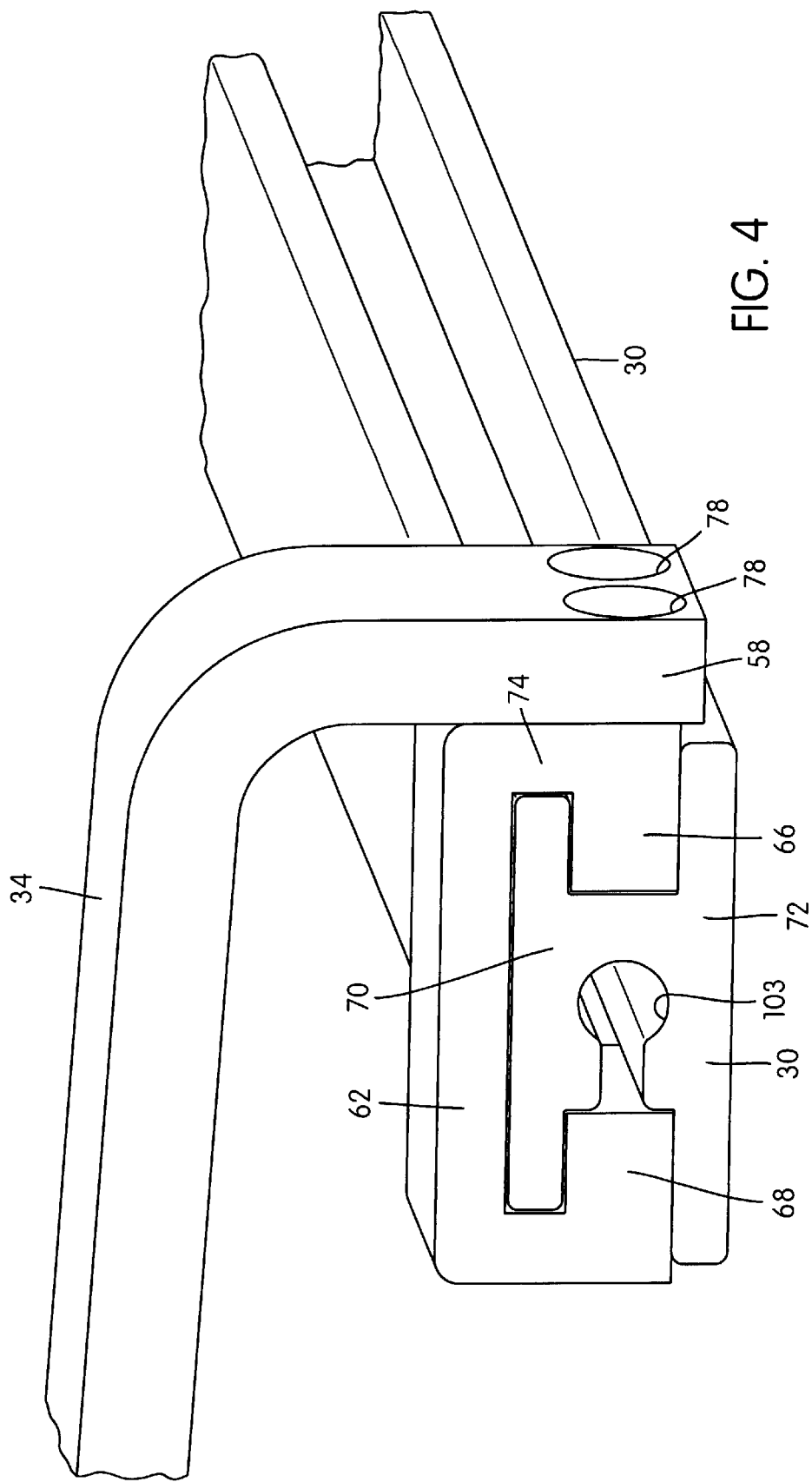
FIG. 4 is an enlarged perspective view showing the connection between a track member, a support member, and a sliding member of the cover assembly.

Specifically, the first and second end portions 58, 60 of each of the support members 34 include respective first and second sliding members 62, 64 secured thereto. The first and second sliding members 62, 64 are slidably mounted on respective first and second track members 30, 32. FIGS. 4–5 illustrate the first sliding member 62 of the first end portion 58 slidably mounted on the first track member 30. The second sliding member 64 is slidably mounted on the second track member 32 in a similar manner. As shown in FIGS. 4–5, the first sliding member 62 is generally C-shaped in cross-section with a pair of inwardly extending flange portions 66, 68, the open end of the C-shaped first sliding member 62 facing downwardly towards the first track member 30. The first track member 30 is generally I-shaped in cross-section such that the pair of inwardly extending flange portions 66, 68 are slidably received between the upper and lower portions 70, 72 of the first track member 30. The first end portion 58 of the support member 34 is mounted on an outer leg 74 of the first sliding member 62 by one or more fasteners, such as a screw 76, that extend through slots 78 in the first end portion 58 and into cooperating threaded slots 80 in the first sliding member 62 respectively.

The first and second sliding members 62, 64 may comprise rolling members such that the support members 34 may roll along the first and second track members 30, 32. Also, the first and second sliding members 62, 64 may be integrally formed with the support members 34. Likewise, the first and second end portions 58, 60 of the support members 34 may be mounted to the first and second track members 30, 32 by any other suitable method, such that each of the support members 34 may be moveable in opposing opening and closing directions along the first and second track members 30, 32, respectively.

As aforementioned, the plurality of support members 34 includes the distal support member 40. In the illustrated embodiment, the distal support member 40 is positioned the most distant from the front end wall 18 with respect to the remaining plurality of support members 34. The distal support member 40 includes a support member 82 having first and second end portions 84, 86 pivotally mountable to first and second sliding members 88, 90. Similar to the first and second sliding members 62, 64 described above, the first and second sliding members 88, 90 are slidably mounted on respective first and second track members 30, 32.

In the illustrated embodiment, the flexible cover 36 is secured to each of the plurality of transverse support members 34, including the distal support member 40. The cover 36 is preferably constructed of fabric, vinyl, or any other suitable textile material. The cover 36 may be secured to the transverse support members 34, the first and second end portions 58, 60 of the support members 34, the sliding members 62, 64, and the distal support member 40 at the first and second end portions 84, 86 by any suitable method such as fasteners, gluing and vibration welding, for example. In the illustrated embodiment, edges 92, 94 of the cover 36 are secured to the first and second end portions 58, 60 of the support members 34 (and the first and second end portions 84, 86 of the distal support member 40), respectively, by one or more fasteners, such as a screw 96. FIG. 5 illustrates the edge 92 of the cover 36 secured to the first end portion 58 of the support member 34. The edge 94 is secured to the second end portion 60 of the support member 34 (as well as the first and second end portions 84, 86 of the distal support member 40) in a similar manner. As shown in FIG. 5, the edge 92 has a hole 98 that is aligned with a corresponding threaded hole 100 formed into a downwardly facing surface of the first end portion 58 of the support member 34. The screw 96 is then inserted through the hole 98 and into the threaded hole 100 to secure the cover 36.

The support members 34 and the distal support member 40 are movably arranged on the first and second track members 30, 32 such that movement of the distal support member 40 in the opening direction towards the front end wall 18 causes the distal support member 40 to push each of the other support members 34 in a sequential manner in the opening direction and hence sequentially collapses the cover 36 secured thereto, thereby facilitating access to the interior space 28 of the vehicle bed 12. Movement of the distal support member 40 along the first and second track members 30, 32 in the closing direction towards the rear end wall 20 causes the distal support member 40 to pull the other support members 34 in a sequential manner in the closing direction and hence sequentially moves the cover 36 secured thereto into covering relation to the interior space 28 of the vehicle bed 12. In its fully closed position, the cover assembly 10 limits access from the top to the interior space 28 of the vehicle bed 12.

Referring to FIGS. 2–3, the cover assembly 10 includes six support members 34, referenced as 34(a) through 34(f) respectively. The cover assembly may include fewer or additional support members 34 than illustrated. As the distal support member 40 is moved towards the front end wall 18 in the opening direction, the distal support member 40 will contact the adjacent support member 34(a) and push the same towards the front end wall 18. Because the cover 36 folds upwardly between the support members 34, the distal support member 40 does not physically contact the adjacent member 34(a) but instead transfers force through the collapsed cover 36 therebetween. As the distal support member 40 and the support member 34(a) continue to move towards the front end wall 18, the support member 34(a) will contact the adjacent support member 34(b) and push the same towards the front end wall 18. The distal support member 40 will continue pushing the support members 34 in sequence, as described above, until all the support members 34(a) through 34(f) are contacting one another which will move the cover 36 secured thereto to a fully open position thereby facilitating access to the interior space 28. The distal support member 40 may also move to any one of a plurality of intermediate open positions thereby permitting access to a portion of the interior space 28.

Similar to the movement described above, as the distal support member 40 is moved towards the rear end wall 20 in the closing direction, from a fully open position for example, the distal support member 40 will pull the adjacent support member 34(a) towards the rear end wall 20 by the cover 36 secured therebetween. As the distal support member 40 and the support member 34(a) continue to move towards the rear end wall 20, the support member 34(a) will pull the adjacent support member 34(b) towards the rear end wall 20. The distal support member 40 will continue pulling the support members 34 in sequence, as described above, until all the support members 34(a) through 34(f) are spaced so the cover 36 secured thereto is moved to a fully closed position that is in complete covering relation to the interior space 28 of the vehicle bed 12. Thus, access to the interior space 28 is inhibited. The distal support member 40 may also move to any one of a plurality of intermediate closed positions, thereby preventing access to a portion of the interior space 28.

Figure 6A:
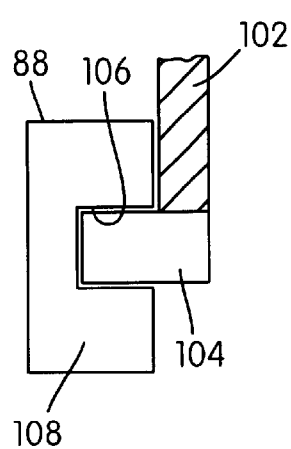
FIGS. 6A–6B are cross-sectional views illustrating a drive cable which is connected to a motor of the cover assembly being secured to a distal support member of the cover assembly.
Figure 6B:
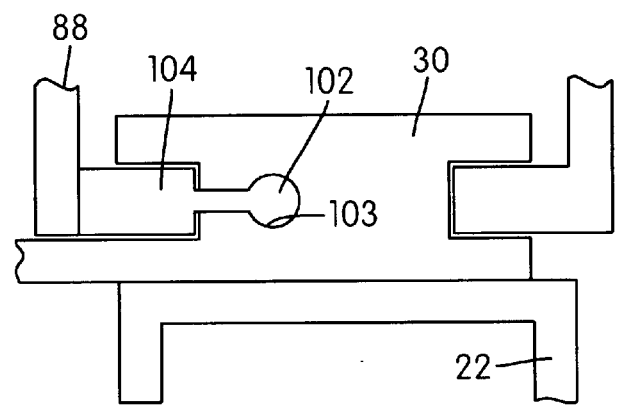

The motor 38 is operatively connected to the distal support member 40. The motor 38 is activated to selectively move the distal support member 40 in the opening and closing directions. In the illustrated embodiment, the motor 38 comprises a drive cable 102 operatively connected thereto. Specifically, in the illustrated embodiment, the cable 102 extends longitudinally through drive tube channels or separate drive tubes 103 in the first and second track members 30, 32 and is secured to the first and second sliding member 88, 90, which are secured the first and second end portions 84, 86 of the distal support member 40. FIGS. 6A–6B illustrate the cable 102 secured to the first sliding member 88. The cable 102 is secured to the second sliding member 90 of the distal support member 40 in a similar manner. As shown in FIGS. 6A–6B, the cable 102 has a cable block 104 secured thereto. The cable block 104 is received in a slot 106 formed in an inwardly extending flange portion 108 of the first sliding member 88. Thus, the motor 38 drives the cable 102 in opening and closing directions to thereby move the distal support member 40 in the opening and closing directions.

The drive tubes 103 of each of the first and second track members 30, 32 are preferably constructed of copper or steel, although other materials are contemplated. The drive tubes 103 may also be channels formed in the track members 30, 32. In the preferred embodiment, the cable 102 is a helix-type cable that is configured and positioned to be engaged with and driven by a worm gear of the motor 38. The motor 38 may be activated by a remote control device, a manual switch, or automatic one-touch switch proximate the vehicle bed 12 or the vehicle cab 14.

As aforesaid, the cover assembly 10 is capable of movement along the vehicle bed 12 to a series of positions. The motor 38 and electronics associated therewith drive the cover assembly 10 to multiple intermediate open/closed positions, a fully open position, or a fully closed position dependent upon what is stored in the vehicle bed 12. The cover assembly 10 is flexible by not constraining the interior space 28. The motor 38 may include an electronic brake to hold the distal support member 40 in the plurality of intermediate positions.

Specifically, the motor is operable to move the distal support member 40 between a fully closed position wherein the flexible cover 36 is positioned in fully covering relation with respect to the interior space 28 of the vehicle bed 12, a fully open position wherein the flexible cover 36 is fully collapsed to permit substantially full access to the interior space 28 of the vehicle bed 12, and at least one intermediate position wherein the flexible cover 36 is positioned in partially covering relation with respect to the interior space 28 of the vehicle 16 thereby covering a portion of the interior space 28 of the vehicle bed 12 and permitting access to another portion of the interior space 28. In the fully open position, substantially full access is permitted to the interior space 28 because the cover assembly 10 itself occupies a small portion of the longitudinal interior space 28.

Figure 7:
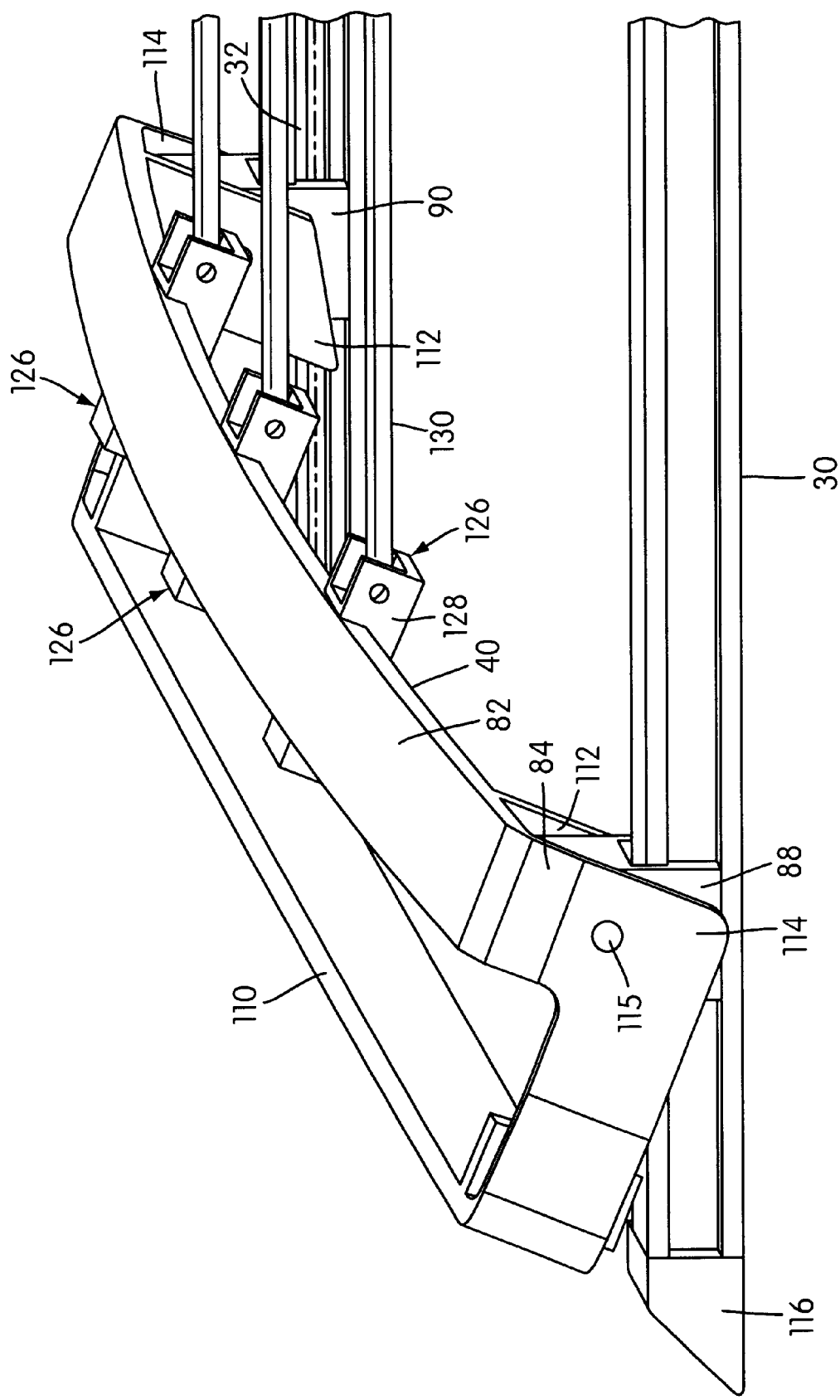
FIG. 7 is a perspective view illustrating the distal support member of the cover assembly and folding mechanisms secured thereto.

The distal support member 40 is also constructed and arranged to retain the cover 36 in tension when the cover 36 is moved to a fully closed position (as shown in FIG. 1), the distal support member 40 being adjacent the rear end wall 20 when the cover 36 is in the fully closed position. Specifically, the distal support member 40 comprises a locking member 110 perpendicularly mountable to the supporting member 82. As aforesaid, the support member 82 has first and second end portions 84, 86 pivotally mountable to the first and second sliding members 88, 90 respectively. Specifically, as illustrated in FIG. 7, the first and second end portions 84, 86 each include a pair of parallel arm members 112, 114. Each of the arm members 112, 114 and the first and second sliding members 88, 90 have a transverse bore therethrough. Moreover, the arm members 112, 114 of the first and second end portions 84, 86 are spaced so as to receive respective first and second sliding members 88, 90 therebetween. The bores of the arm members 112, 114 and corresponding first and second sliding members 88, 90 are aligned so as to receive a pin 115 therethrough. Thus, the support member 82 and the locking member 110 therewith, is longitudinally movable on the first and second track members 30, 32 and pivotally movable relative to the first and second sliding members 88, 90.

Each of the first and second track members 30, 32 have respective end blocks 116 adjacent the rear end wall 20. The first and second end portions 84, 86 are configured and positioned to pivot the support member 82 and hence the locking member 110 mounted thereto when the distal support member 40 is longitudinally moved in the closing direction into contact with the end blocks 116 of respective first and second track members 30, 32. The support member 82 and locking member 110 mounted thereto are pivoted in a direction towards the rear end wall 20 such that the locking member 110 is pivoted to a locked position behind the first and second end blocks, thereby preventing the distal support member 40 from movement in the opening direction towards the front end wall 18.

Figure 9:
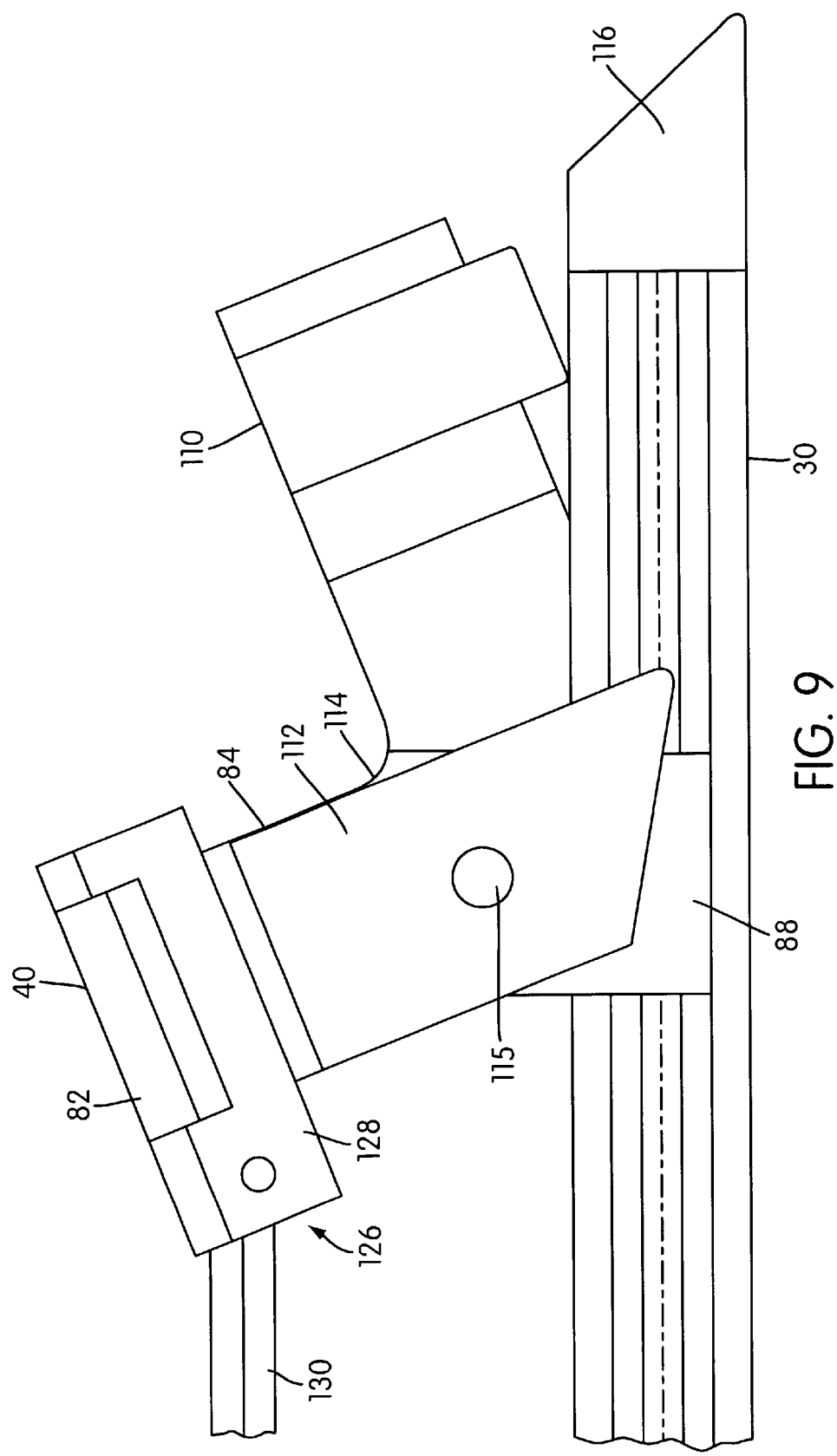
FIG. 9 is a side view illustrating the distal support member being moved to a fully closed position.
Figure 10:
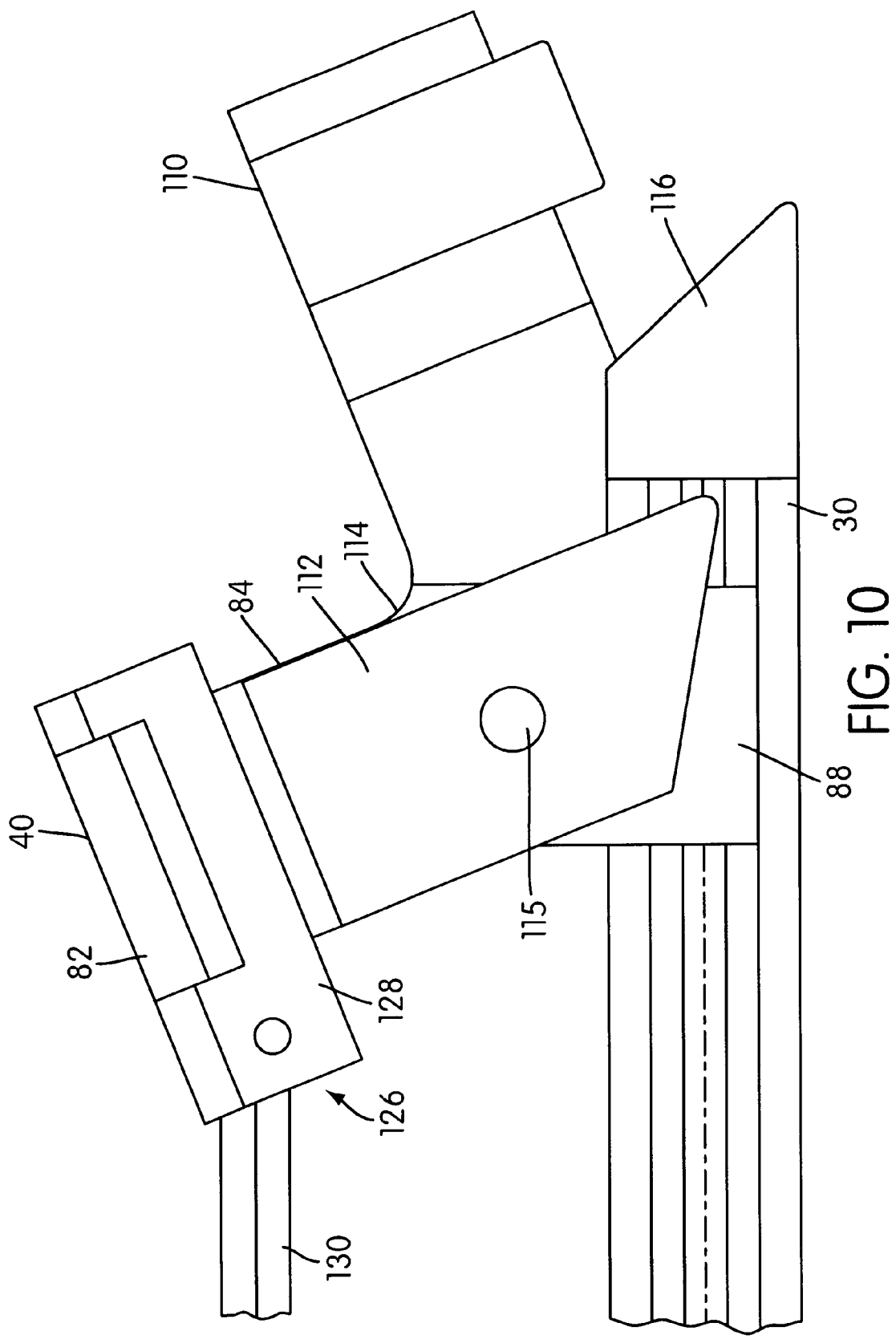
FIG. 10 is a side view illustrating the distal support member being pivoted to a locked position.
Figure 11:
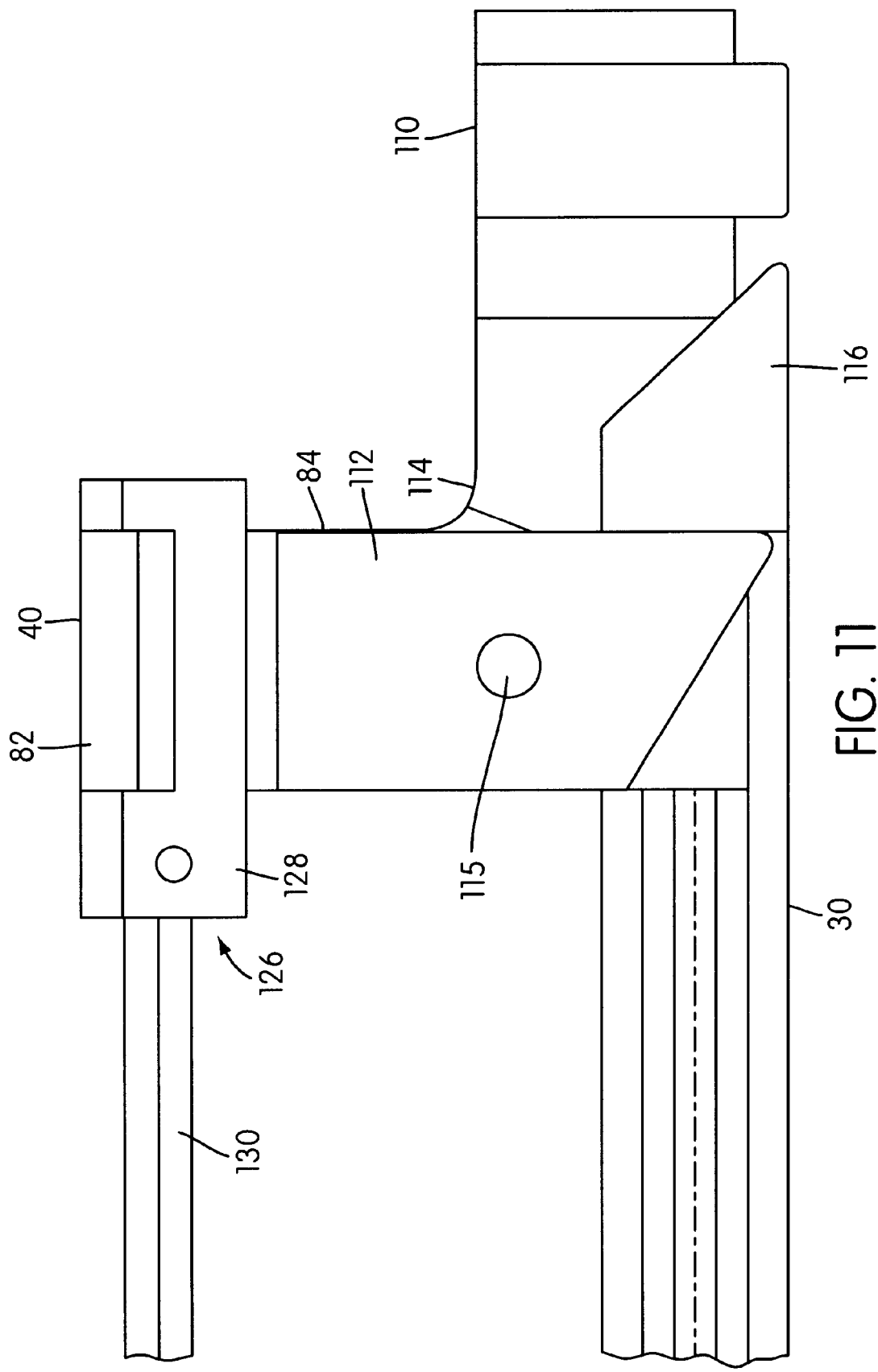
FIG. 11 is a side view illustrating the distal support member in the locked position.
Figure 12:
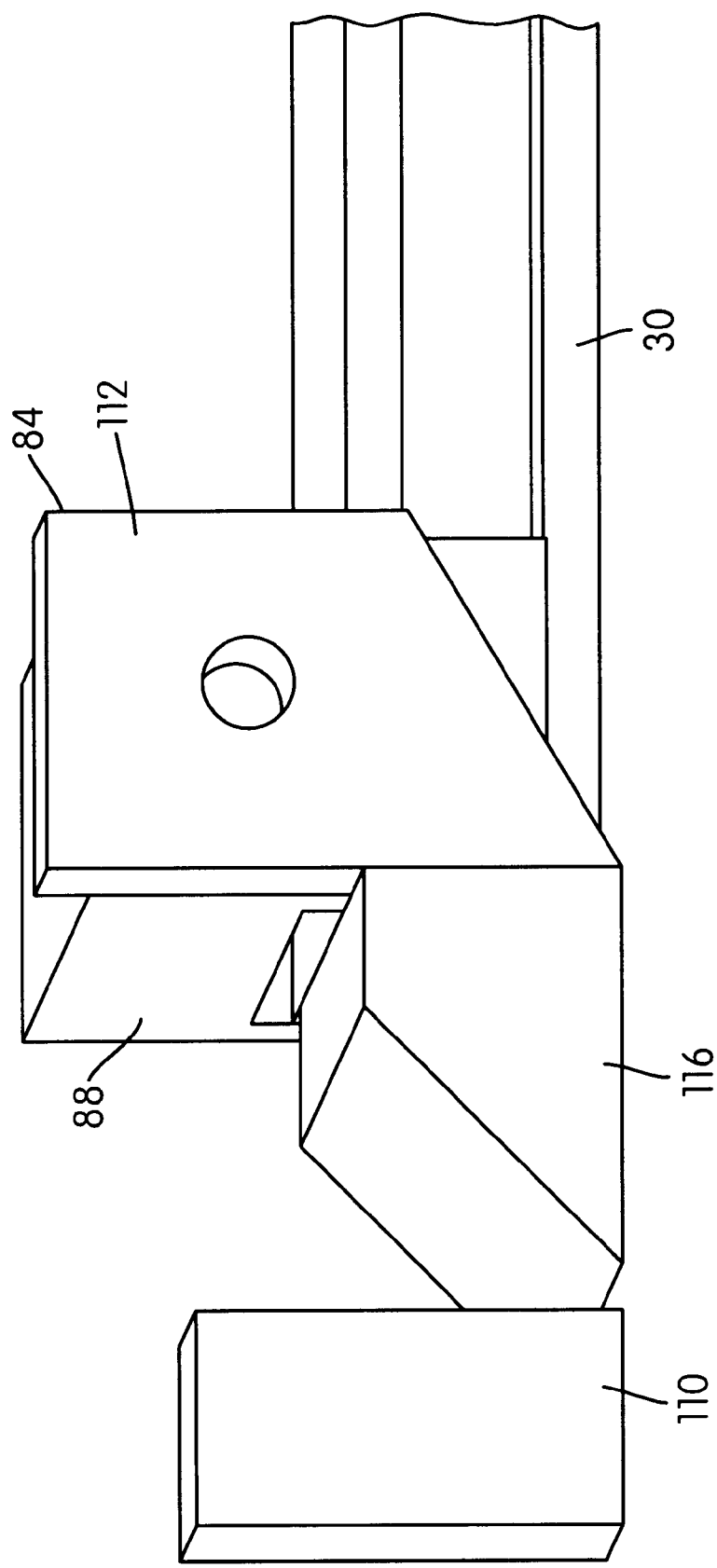
FIG. 12 is a perspective view illustrating the distal support member in the locked position.

As shown in FIG. 7, the arm member 114 connects the support member 82 to the locking member 110 and the arm member 112 is configured and positioned to effect the pivoting of the support member 82 and the locking member 110 upon contact with the end blocks 116. FIGS. 9–12 illustrate the distal support member 40 being moved to the fully closed position and then pivoted to the locked position. As shown in FIG. 9, the locking member 110 rides along upper surfaces of the first and second track members 30, 32 as the distal support member 40 moves the cover 36 to a fully closed position. In FIG. 10, as the first and second sliding members 88, 90 move the distal support member 40 towards the end block 116 in the second direction, the locking member 110 moves past the end block 116 and a corner of the arm member 112 is positioned into contact with the end block 116. In FIG. 11, as the first and second sliding members 88, 90 continue to move in the closing direction, the arm member 112 pivots the support member 82 and locking member 110 mounted thereto about the corner in a direction towards the rear end wall 20. The support member 82 and the locking member 110 continue to pivot until the first and second sliding members 88, 90 engage the end blocks 116 which prevents further movement in the closing direction. As a result, the locking member 110 is pivoted to a locked position behind the end blocks 116 thereby preventing the distal support member 40 from movement in the opening direction, as shown in FIGS. 11–12.

The cover assembly 10 may further comprise at least one folding mechanism 126 secured to each of the support members 34, including the distal support member 40. Each of the folding mechanisms 126 tends to cause an adjacent portion of the cover 36 to fold in a predetermined direction as the supporting member adjacent thereto is moved in the opening direction.

Figure 8:
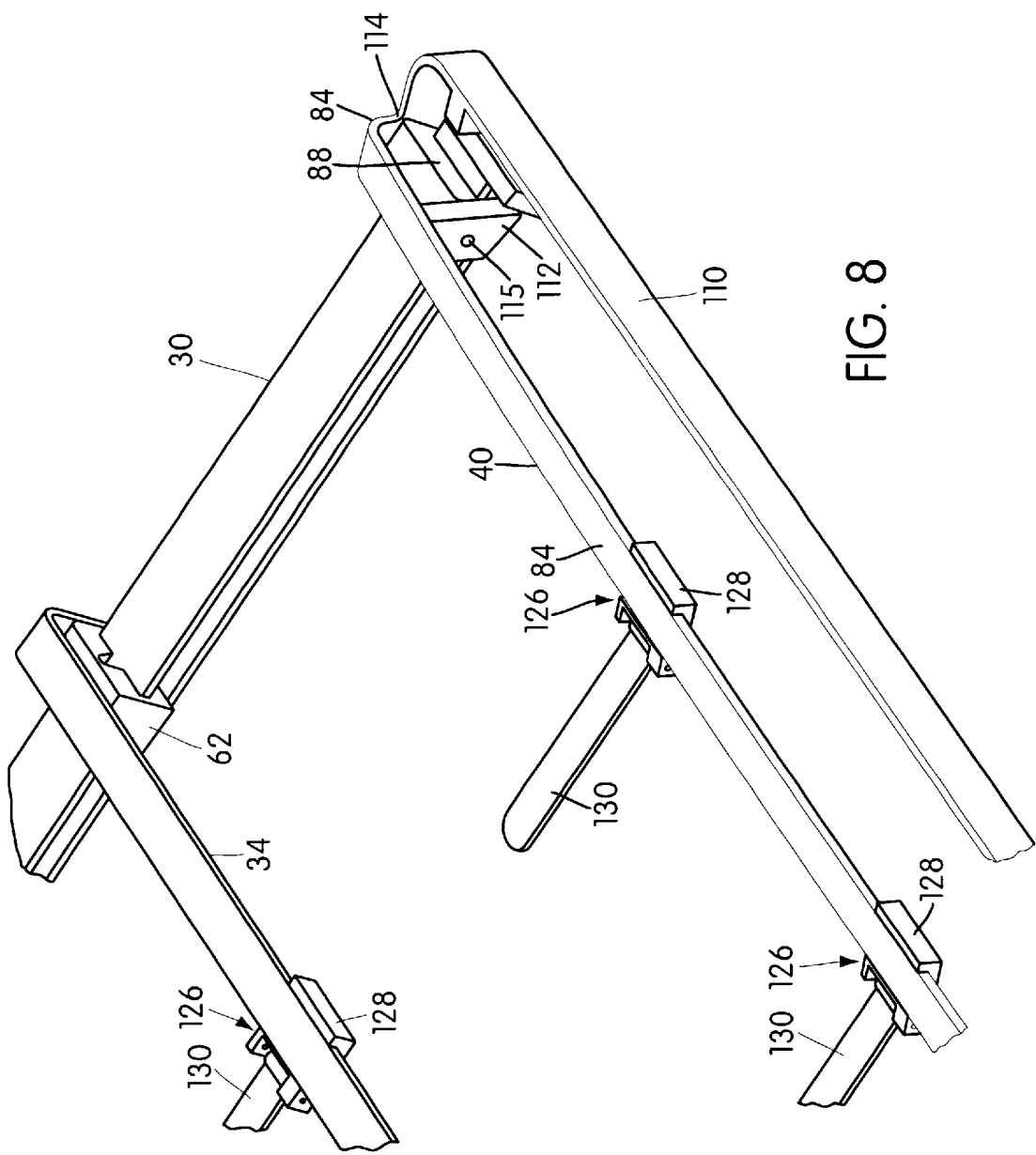
FIG. 8 is a perspective view illustrating the distal support member of the cover assembly and an adjacent supporting member.
Figure 13:
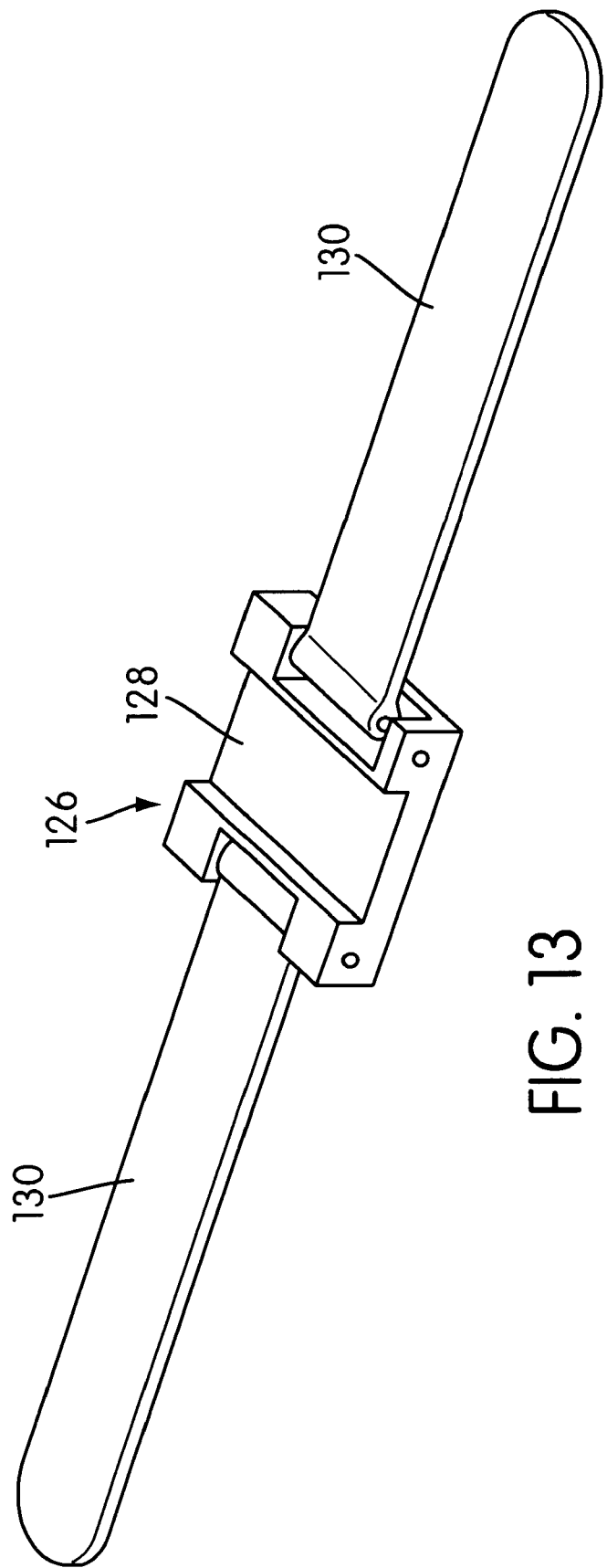
FIG. 13 is a perspective view illustrating the folding mechanism of the cover assembly.

Referring to FIG. 13, the folding mechanism 126 comprises a base member 128 secured to the support member 34 (or support member 82 of the distal support member 40), an elongated flipper member 130 pivotally mounted to the base member 128, and a spring operatively mounted to the base member 128 to bias the flipper member 130 in a pivot direction. Each base member 128 may comprise a pair of flipper members 130 as shown in FIGS. 3 and 13 or one flipper member 130 as shown on FIG. 8. The distal support member 40, as well as the support member 34 the most proximate from the front end wall 18 with respect to the remaining plurality of support members 34, always comprise one flipper member 130, as shown in FIG. 3. The folding mechanisms 126 may be mounted to the first and second sliding members 62, 64 (including the first and second sliding members 88, 90 of the distal support member 40), as shown in FIG. 3.

If pairs of flipper members 130 are utilized, the flipper member 130 of each of the support members 34 (and distal support member 40) is aligned with respect to one another such that, when the distal support member 40 is moved in the opening direction, adjacent flipper members 130 contact one another by corner contact to effect pivotal rotation in the pivot direction under biasing from the spring. Thus, the flipper members 130 cause the adjacent portion of the cover 36 to fold in the predetermined direction.

If one flipper member 130 is utilized, the flipper member 130 of each of the support members 34 (and distal support member 40) contacts an adjacent support member 34 to effect the pivotal rotation.

Figure 15:
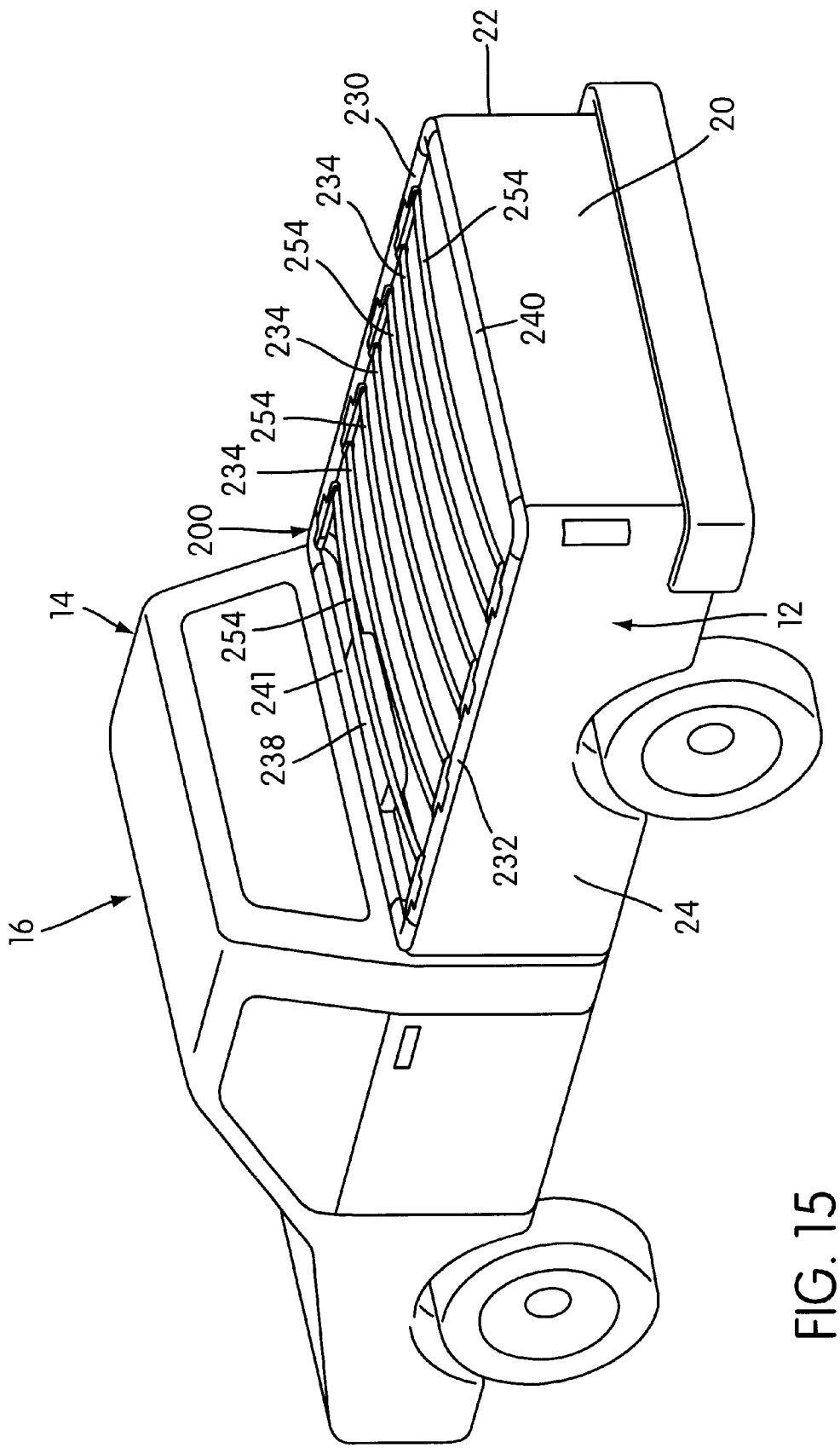
FIG. 15 is a perspective view of a cover assembly for a vehicle bed constructed according to another embodiment of the present invention, the cover assembly being installed on a vehicle bed.
Figure 16:
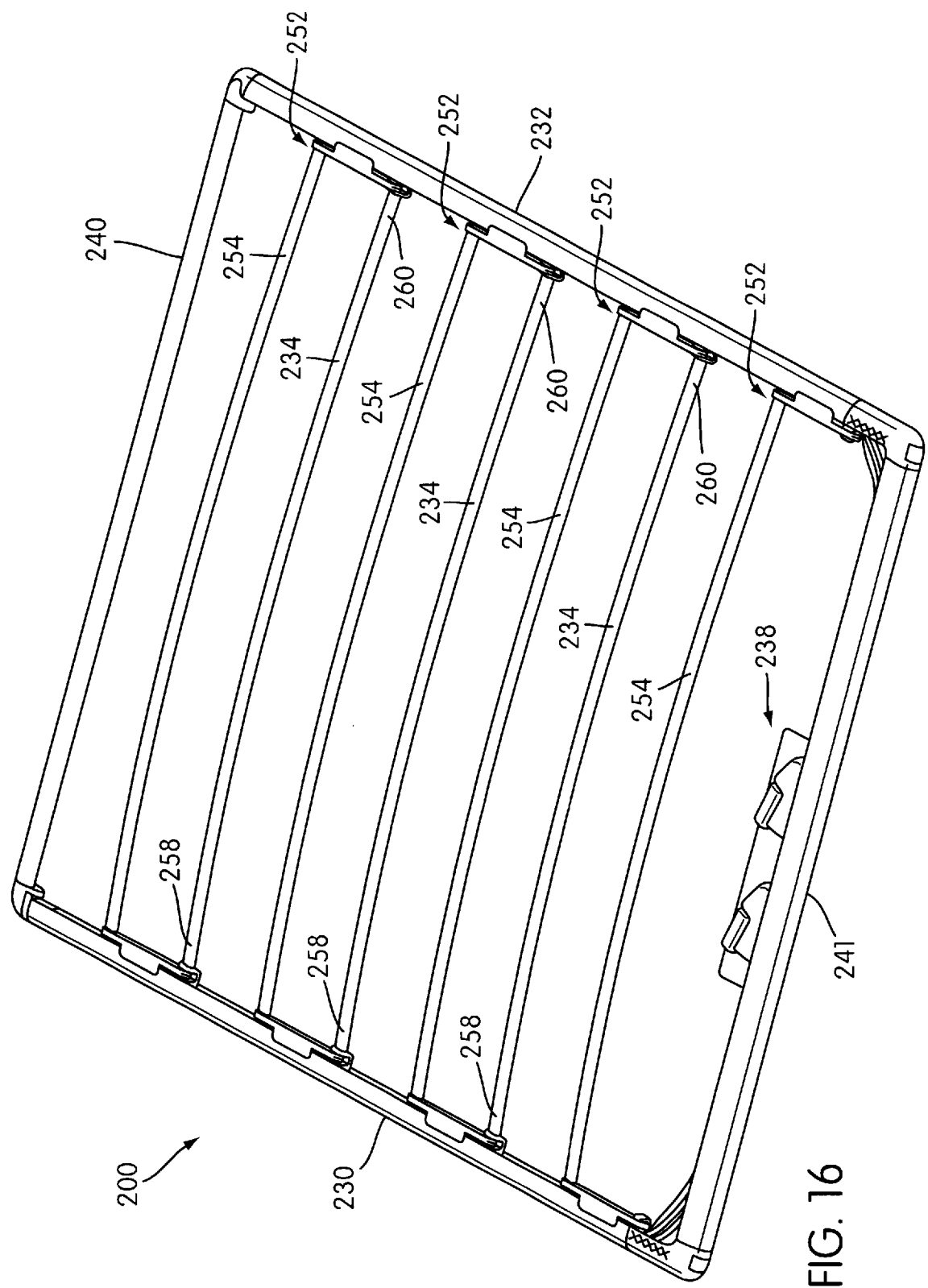
FIG. 16 is a perspective view illustrating the cover assembly shown in FIG. 15.
Figure 17:
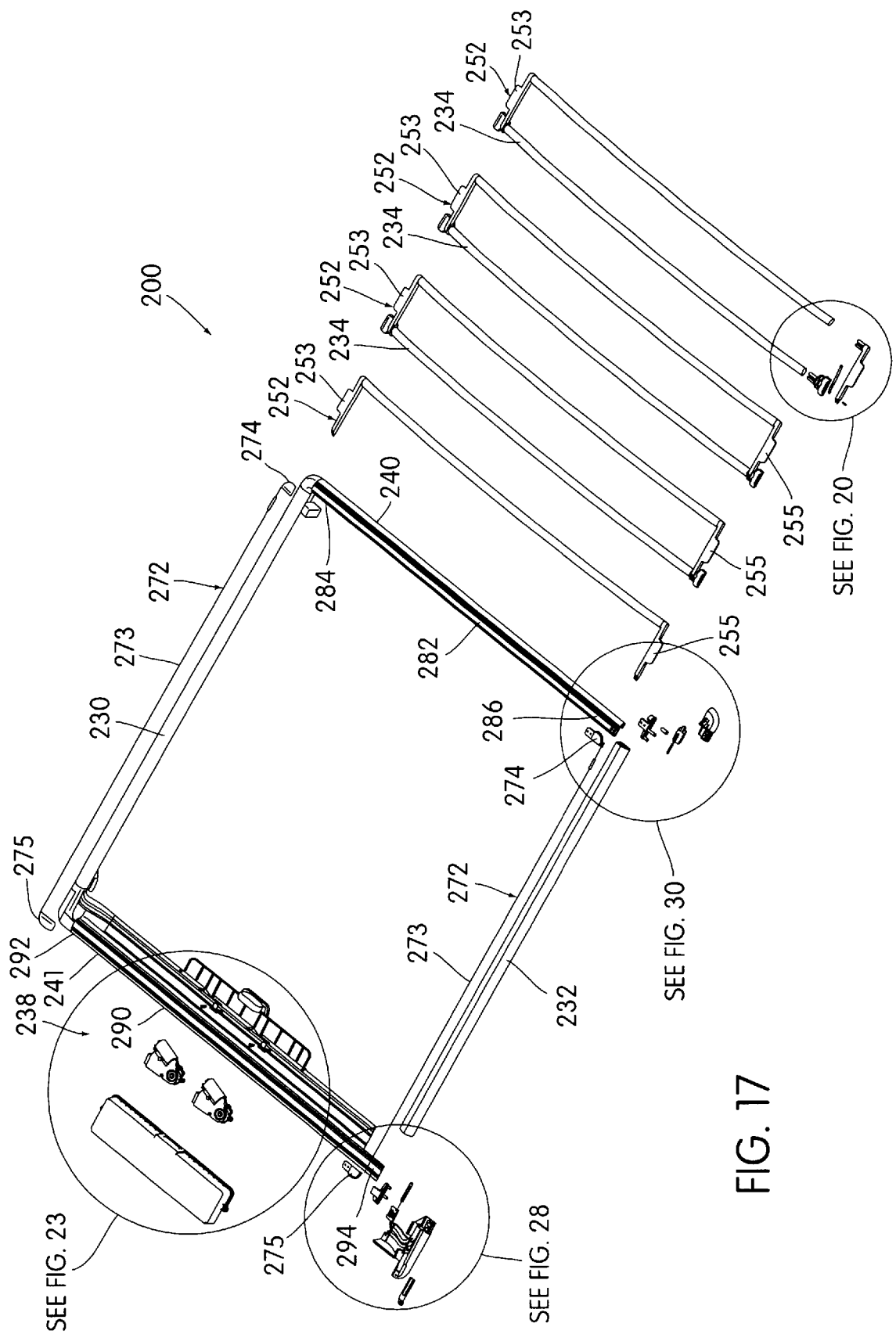
FIG. 17 is an exploded perspective view of the cover assembly of FIG. 15.

A further embodiment of the cover assembly, indicated as 200, is illustrated in FIGS. 15–36. As shown in FIGS. 15–17, the cover assembly 200 includes first and second elongated track members 230, 232, a plurality of transverse support members 234, a flexible cover 236 (shown in FIGS. 18 and 22), and a motor 238. The plurality of transverse support members 234 includes a distal support member 240 and a proximal support member 241, as will be further discussed below.

Figure 18:
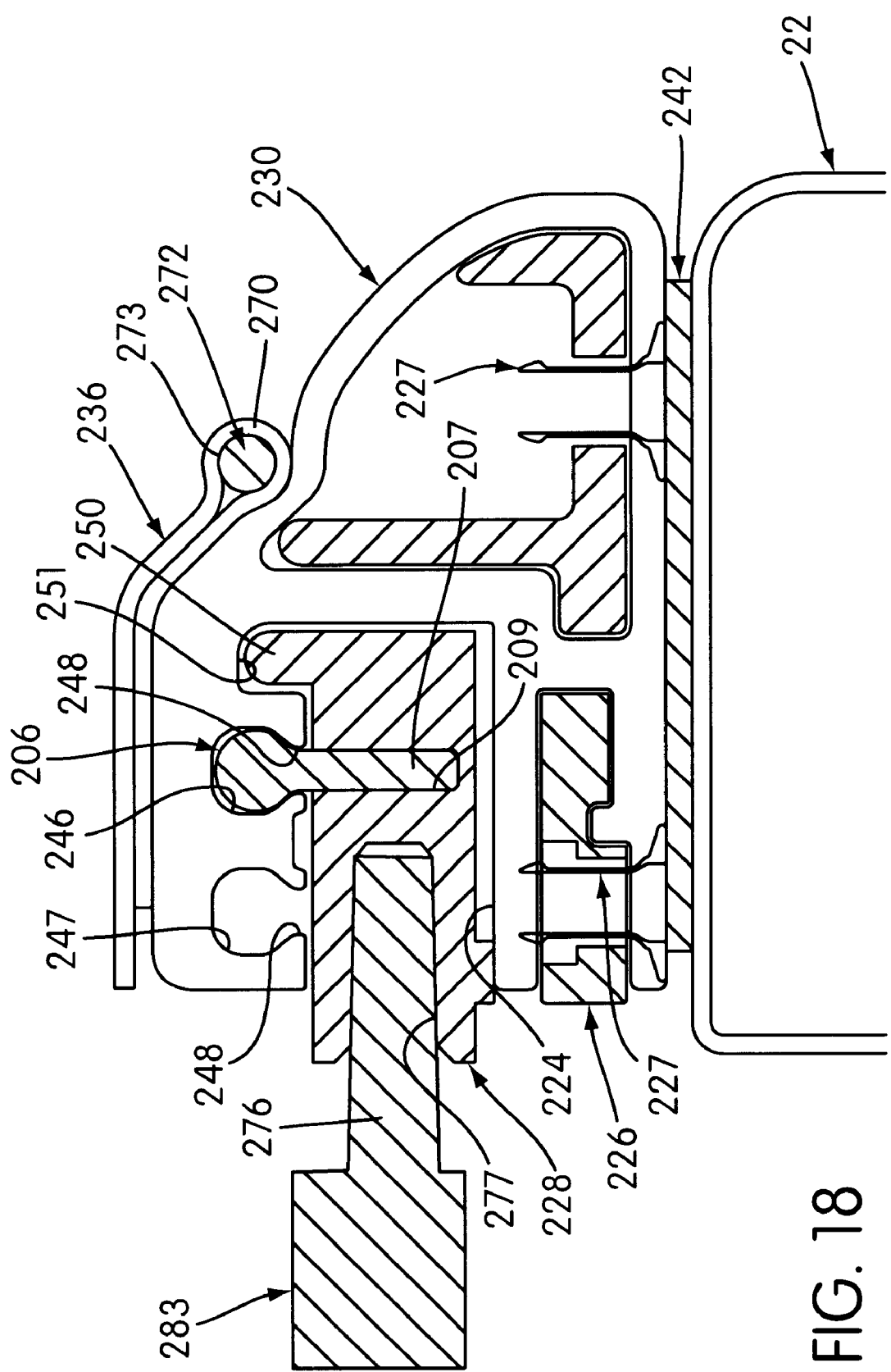
FIG. 18 is a cross-sectional view illustrating the mounting of the track member to a side wall of the vehicle bed and the interconnection of the components of the cover assembly of FIG. 15.

The first track member 230 is mountable to the first side wall 22 of the vehicle bed 12 and the second track member 232 is mountable to the second side wall 24 of the vehicle bed 12, as shown in FIG. 15. Similar to the above, the first and second track members 230, 232 may be mounted to respective first and second side walls 22, 24 by any suitable method, such as a by a plurality of clamps, by a plurality of bolts, or by welding, for example. As shown in FIG. 18, a foam pad 242 may be positioned between each track member 230, 232 and its respective side wall 22, 24 to protect the side walls 22, 24 of the vehicle and absorb vibrations.

Because the first and second track members 230, 232 are similar to one another, an understanding of one will suffice for an understanding of both. As shown in FIG. 18, the first track member 230 is an extruded structure that provides a sliding member opening 244 and first and second cable conduits 246, 247. The sliding member opening 244 and the first and second cable conduits 246, 247 extend longitudinally along the first track member 230. In FIG. 18, the first cable conduit 246 is a drive cable conduit and the second cable conduit 247 is a return cable conduit, as will be further discussed. Each of the drive and return cable conduits 246, 247 has a longitudinally extending slot 248.

The first and second track members 230, 232 are constructed and arranged to slidably mount each of the plurality of support members 234. Each of the plurality of transverse support members 234 have first and second end portions 258, 260. The first end portions 258 are mountable on the first track member 230 and the second end portions 260 are mountable on the second track member 232 to enable the support members 234 to be moved in opposing opening and closing directions along the first and second track members 230, 232, respectively, as shown in FIGS. 16–17.

Figure 19:
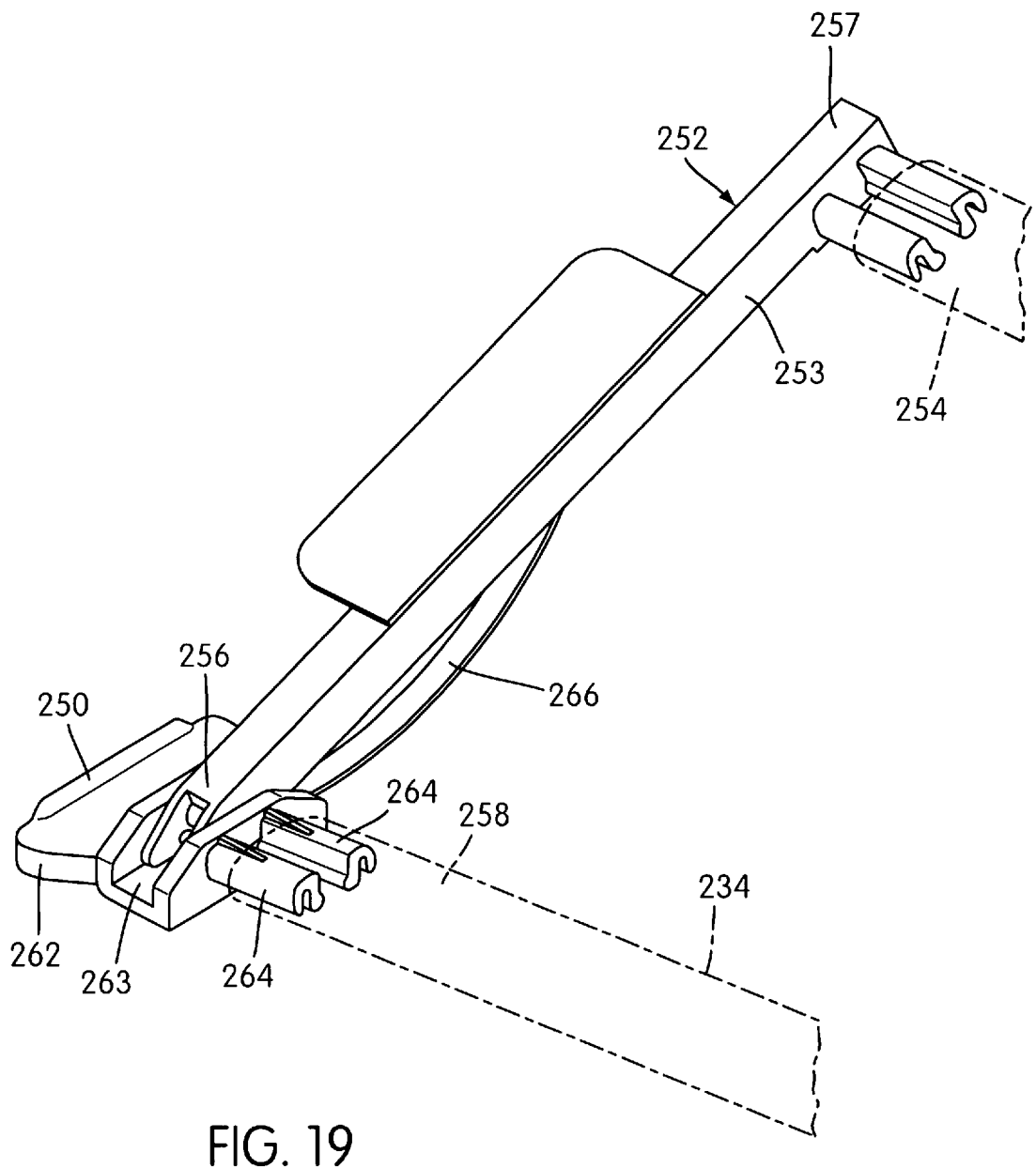
FIG. 19 is a perspective view illustrating a support member of the cover assembly of FIG. 15 and a fold initiating mechanism secured thereto.
Figure 20:
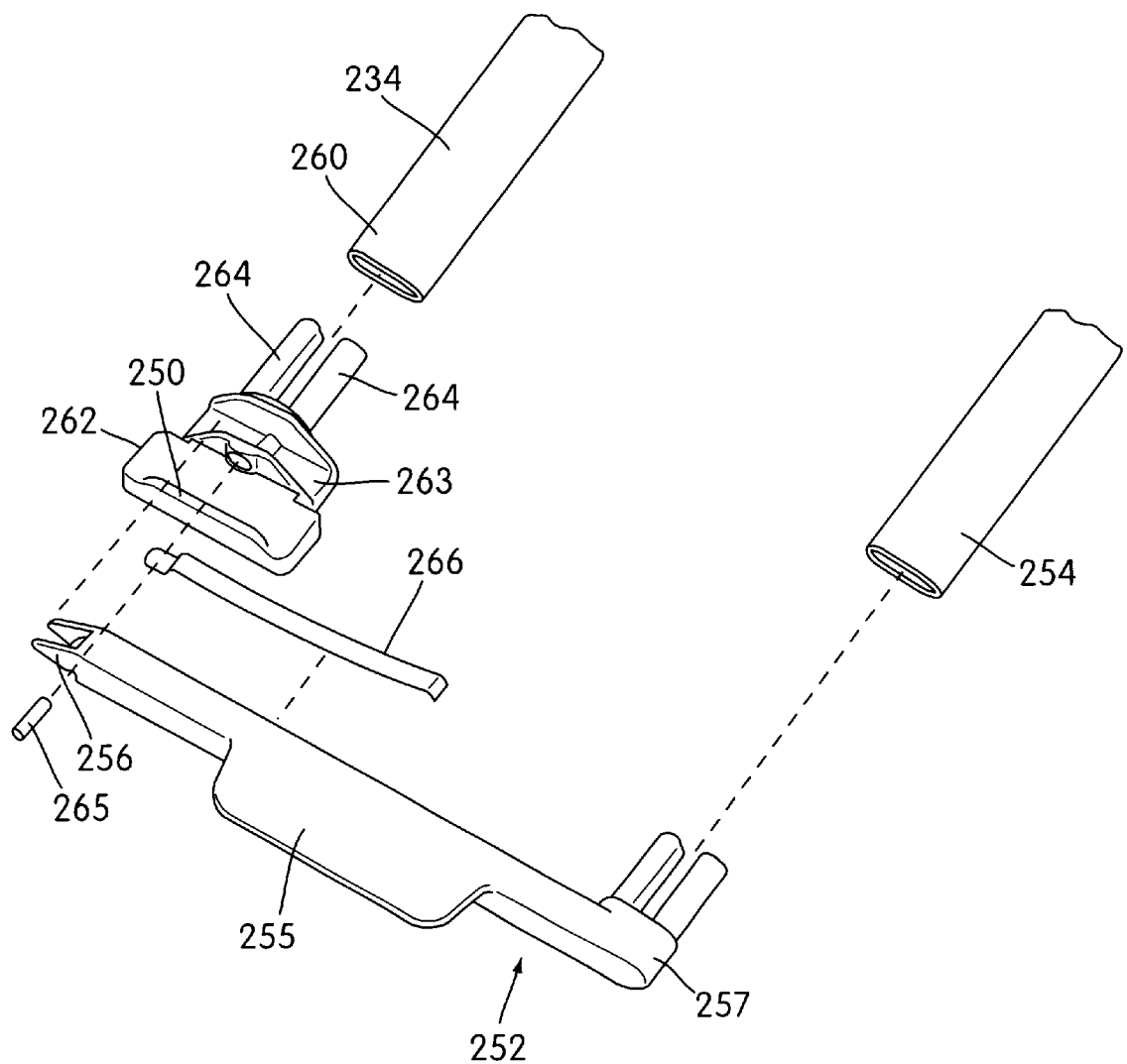
FIG. 20 is an enlarged perspective view showing the connection between a sliding member, a support member, and a fold initiating mechanism of the cover assembly shown in FIG. 17.

Specifically, as shown in FIGS. 19–20, the first end portion 258 (as well as the second end portion 260) of each of the support members 234 include sliding members 262 secured thereto. In the illustrated embodiment, the sliding member 262 has a pair of pins 264 which are received within corresponding openings provided in the end portion 258 of the support member 234 to securely mount the sliding member 262 to the support member 234. The sliding members 262 are slidably mounted within the sliding member opening 244 of respective first and second track members 230, 232. FIG. 18 illustrates the sliding member 288 of the distal support member 240 (which is similar to sliding members 262) slidably mounted on the first track member 230. The sliding member 288 (as well as sliding member 262) include an upwardly extending guide member 250 which is received within a corresponding guide recess 251 provided in the track member 230. The guide member 250 prevents transverse movement of the sliding member 262 with respect to the track member 230. The other sliding member 288 of the distal support member 240 is slidably mounted within the second track member 232 in a similar manner. The sliding members 262 of the support members 234 are slidably mounted on the first and second track members 230, 232 in a similar manner.

The first and second end portions 258, 260 of the support members 234 may be mounted to the first and second track members 230, 232 by any other suitable method, such that each of the support members 234 may be moveable in opposing opening and closing directions along the first and second track members 230, 232, respectively.

A plurality of fold initiating mechanisms 252 are mounted between each pair of adjacent support members 234. Each of the fold initiating mechanisms 252 has a portion that engages an adjacent portion of the cover 236 between an associated pair of adjacent support members 234 so as to initiate folding of the adjacent portion in a predetermined direction as one of the associated pair of adjacent support members 234 is being moved towards the other of the associated pair in the opening direction.

Figure 21:
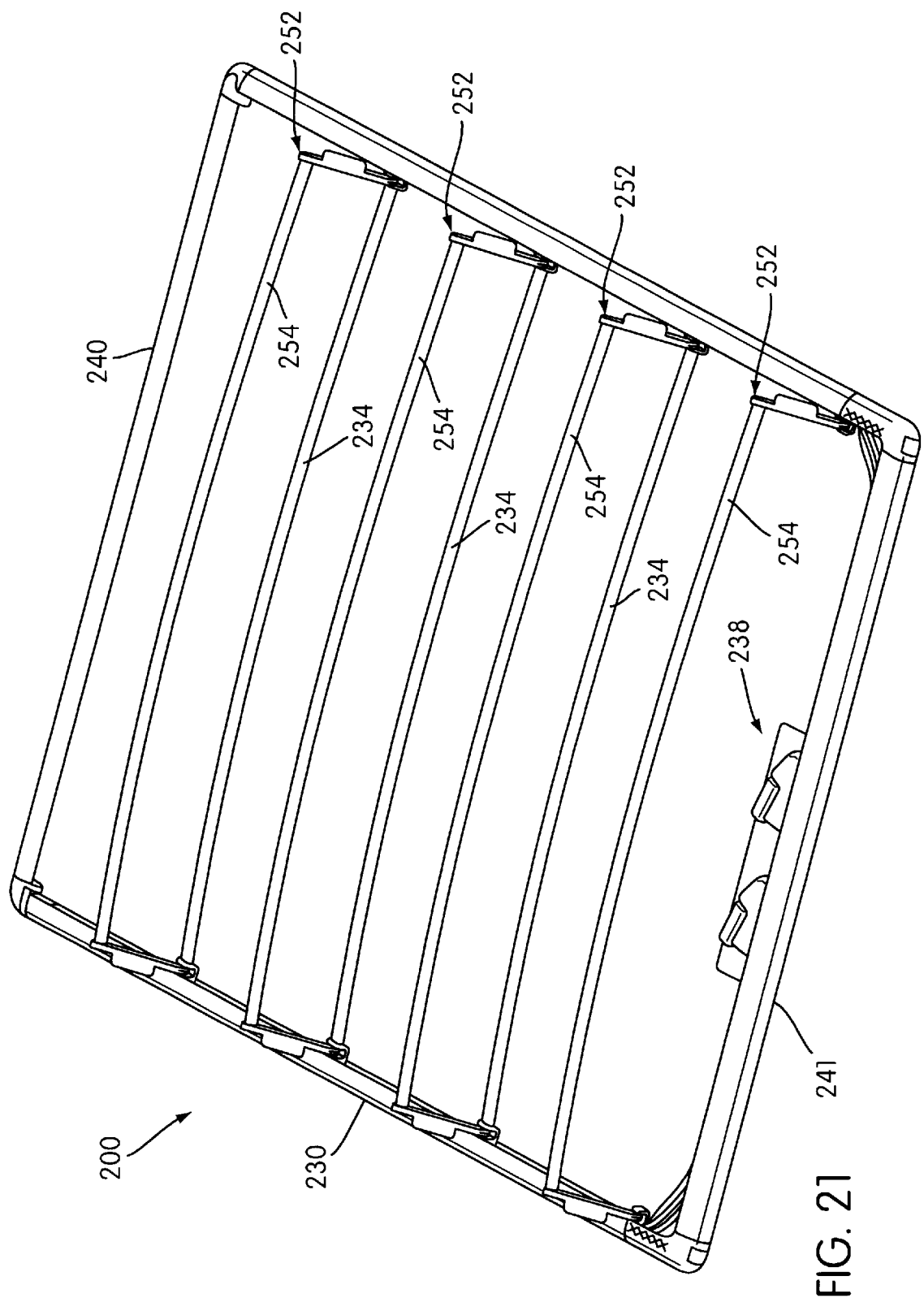
FIG. 21 is a perspective view illustrating the cover assembly shown in FIG. 15 with the fold initiating mechanisms in an upwardly pivoted position.

Each mechanism 252 includes first and second elongated flipper members 253, 255 each having one end 256 pivotally mounted with respect to the first and second track members 230, 232, shown best in FIGS. 16 and 21. The opposite ends 257 of the flipper members 253, 255 are structured to mount a transverse support member 254 therebetween. The support member 254 is secured to the opposite ends 257 of the flipper members 253, 255 in the same manner as the support members 234 are secured to the sliding members 262.

As shown in FIGS. 19–20, the flipper members 253, 255 are pivotally mounted to respective sliding members 262. Specifically, the sliding members 262 include a flipper member mounting structure 263. The flipper members 253, 255 are pivotally mounted to respective mounting structures 263 via a pivot pin 265. As a result, the flipper members 253, 255 pivot with respect to the sliding members 262 about the pivot pin 265. A spring 266 is operatively mounted between the sliding member 262 and the corresponding flipper member 253, 255 to bias the flipper member 253, 255 in a pivot direction. FIG. 21 illustrates the fold initiating mechanisms 252 in an upwardly pivoted position. Tension in the cover 236 maintains the support member 254 and flipper members 253, 255 in an unpivoted position at track member elevation.

Figure 27:
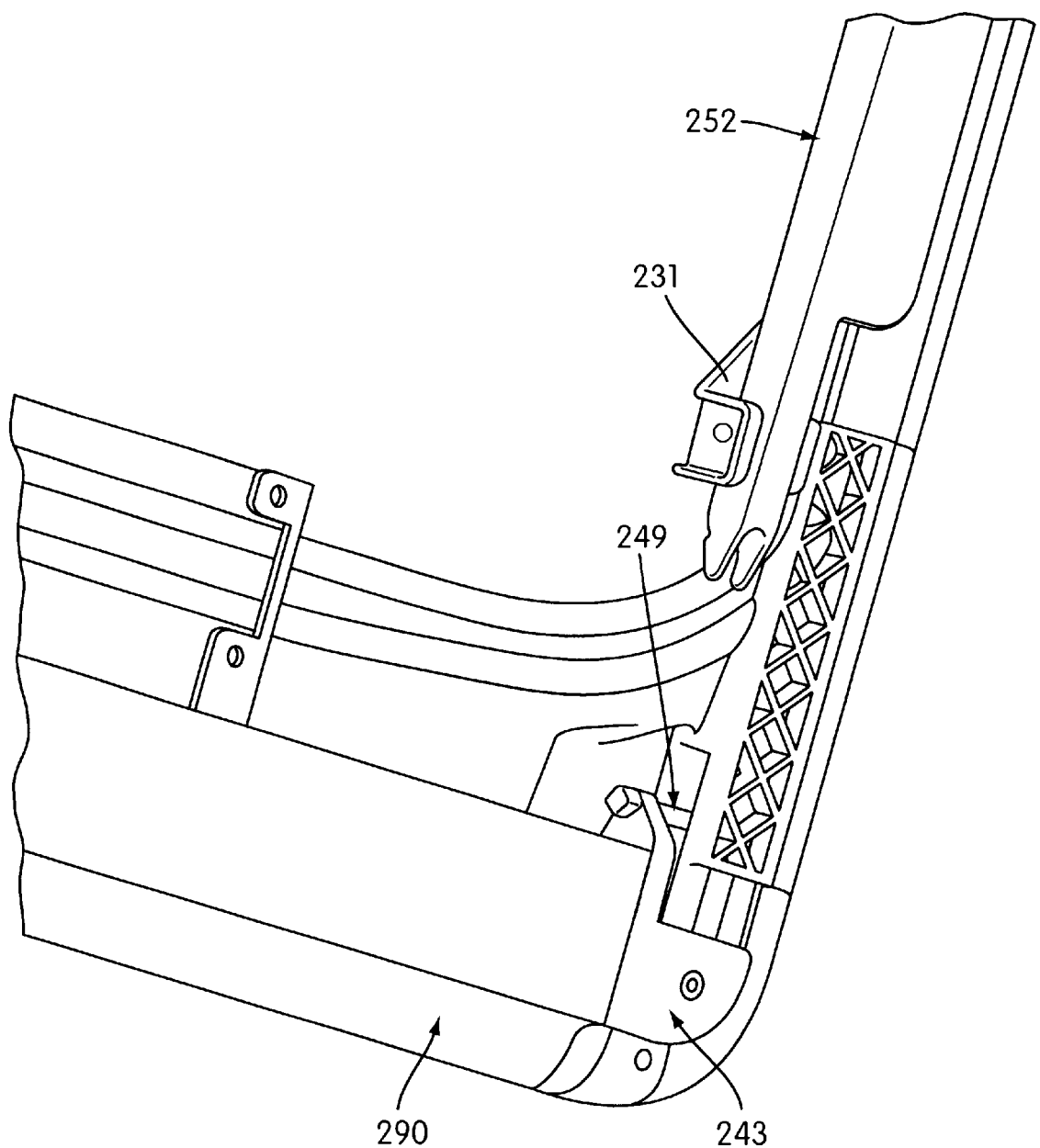
FIG. 27 is another perspective view of the cover tensioner shown in FIG. 26.

As shown in FIG. 17, the cover assembly 200 includes three support members 234 each having fold initiating mechanisms 252 pivotally mounted thereto, a distal support member 240, a proximal support member 241, and a fold initiating mechanism 252 pivotally mounted to mounting structures 231 provided on the first and second track members 230, 232 adjacent the proximal support member 241 (as most clearly shown in FIG. 27).

Figure 22:
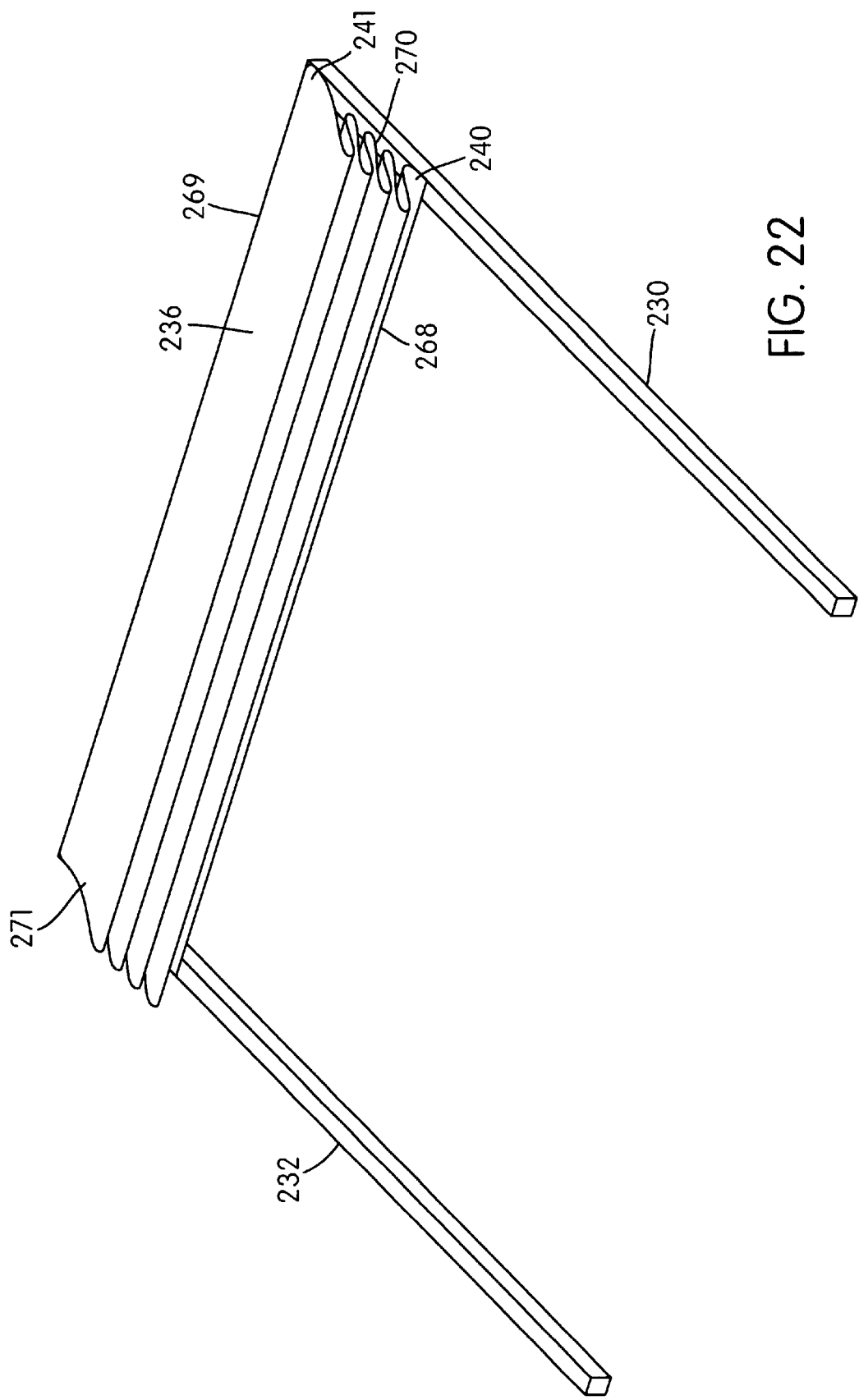
FIG. 22 is a perspective view illustrating the cover of the cover assembly in a fully collapsed and folded condition.

When the distal support member 240 is moved in the opening direction, tension in the cover 236 is relieved and the adjacent support member 254 of the adjacent fold initiating mechanism 252 will pivot in the pivot direction under biasing from the spring 266. As a result, the support member 234 remains at track member elevation and the support member 254 engages an adjacent portion of the cover 236 so as to initiate folding of the adjacent portion in a predetermined direction. In the illustrated embodiment, the cover 236 is attached to both support members 234, 254 to control folding of the cover 236 in the predetermined direction. As the cover continues to collapse, the fold initiating mechanisms 252 pivot in the pivot direction in sequential order as tension in the cover is sequentially relieved. FIG. 22 illustrates the cover 236 in a fully collapsed and folded condition.

As aforementioned, the plurality of support members 234 includes the distal support member 240 and the proximal support member 241. As shown in FIG. 17, the distal support member 240 includes a support member 282 having first and second end portions 284, 286 pivotally mountable to respective sliding members 288. As described above, the sliding members 288 are slidably mounted on respective first and second track members 230, 232 similar to the sliding members 262.

Figure 26:
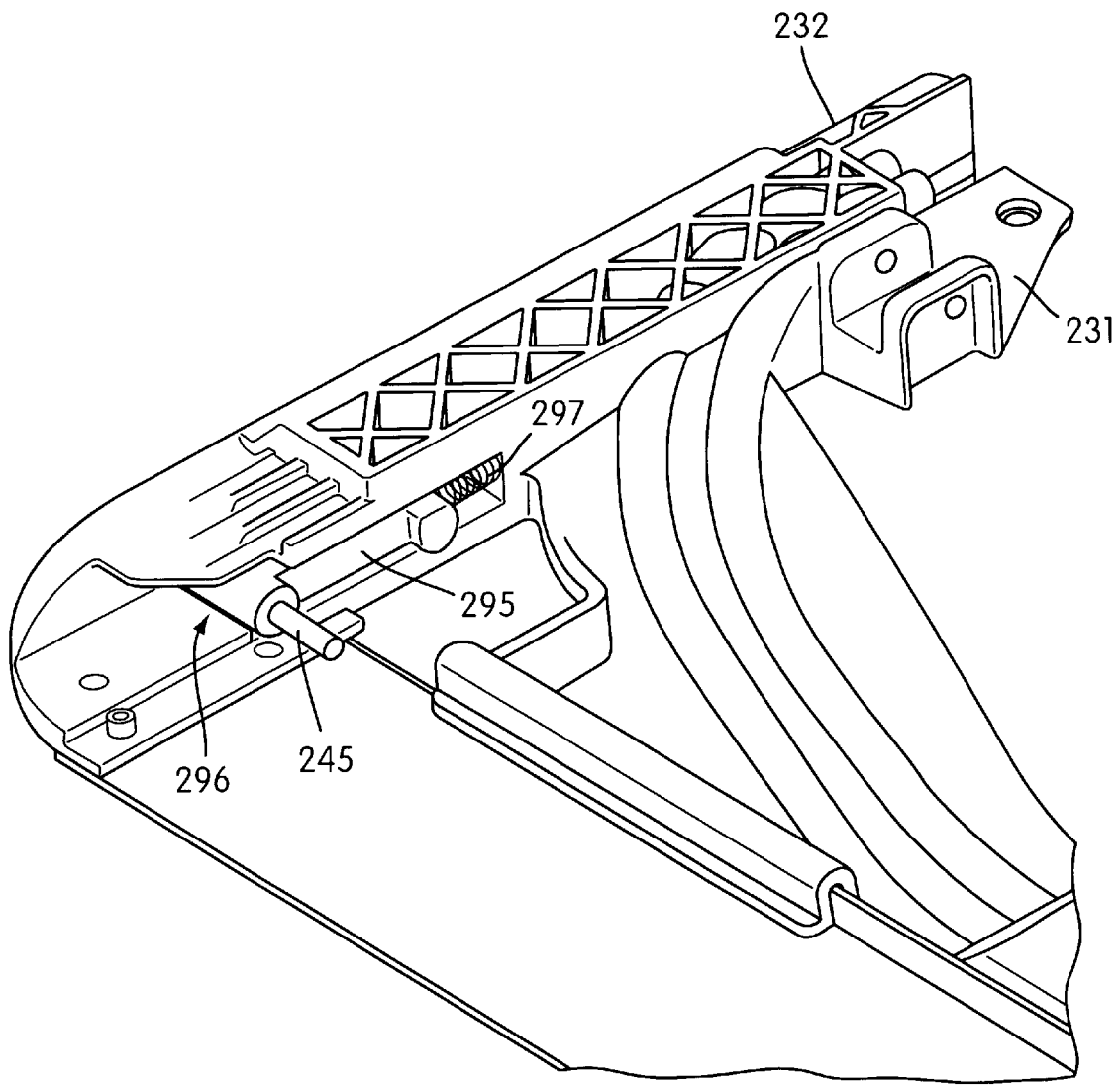
FIG. 26 is a perspective view illustrating an embodiment of the cover tensioner of the cover assembly.
Figure 28:
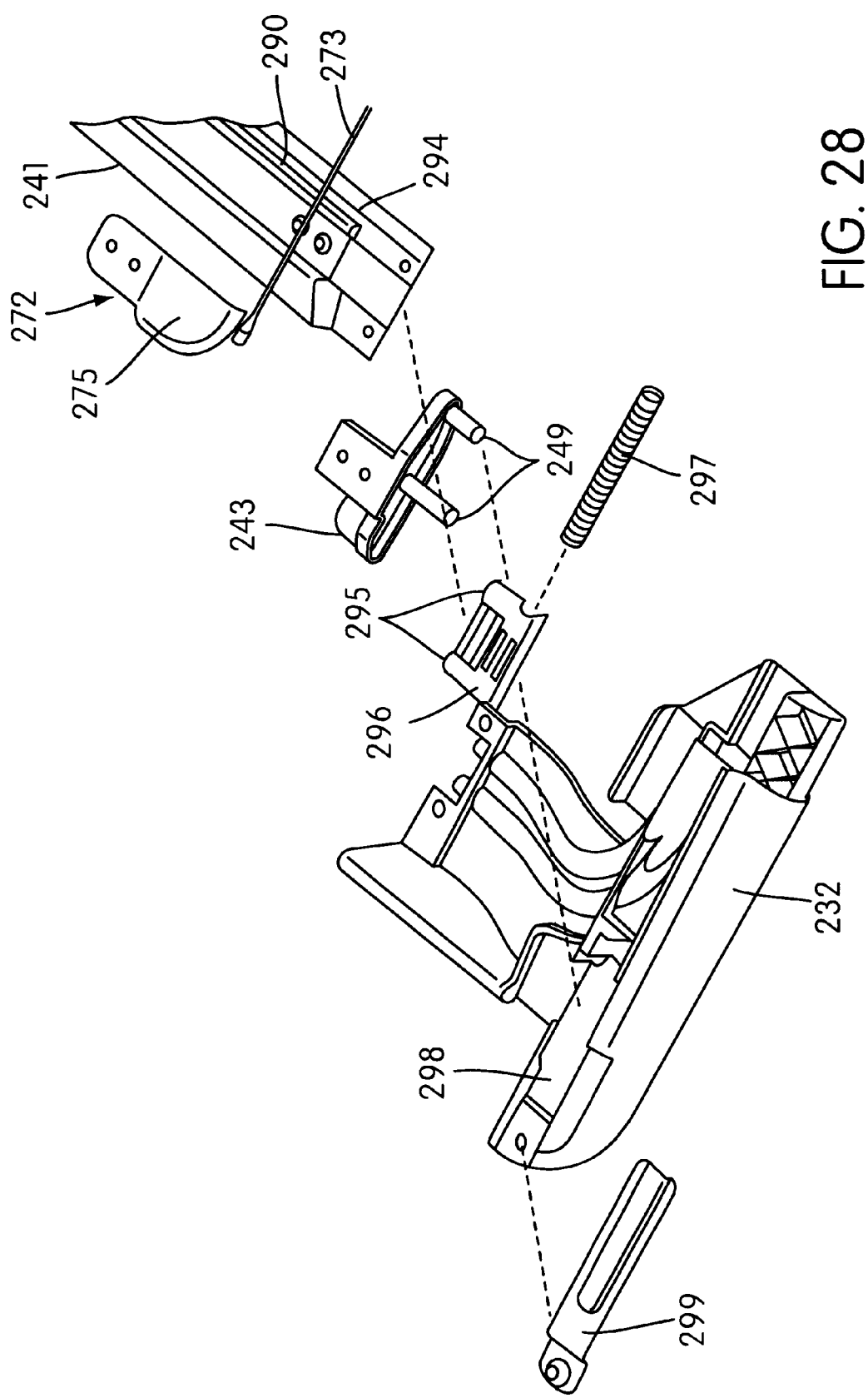
FIG. 28 is an enlarged perspective view showing another embodiment cover tensioner of the cover assembly.
Figure 29:
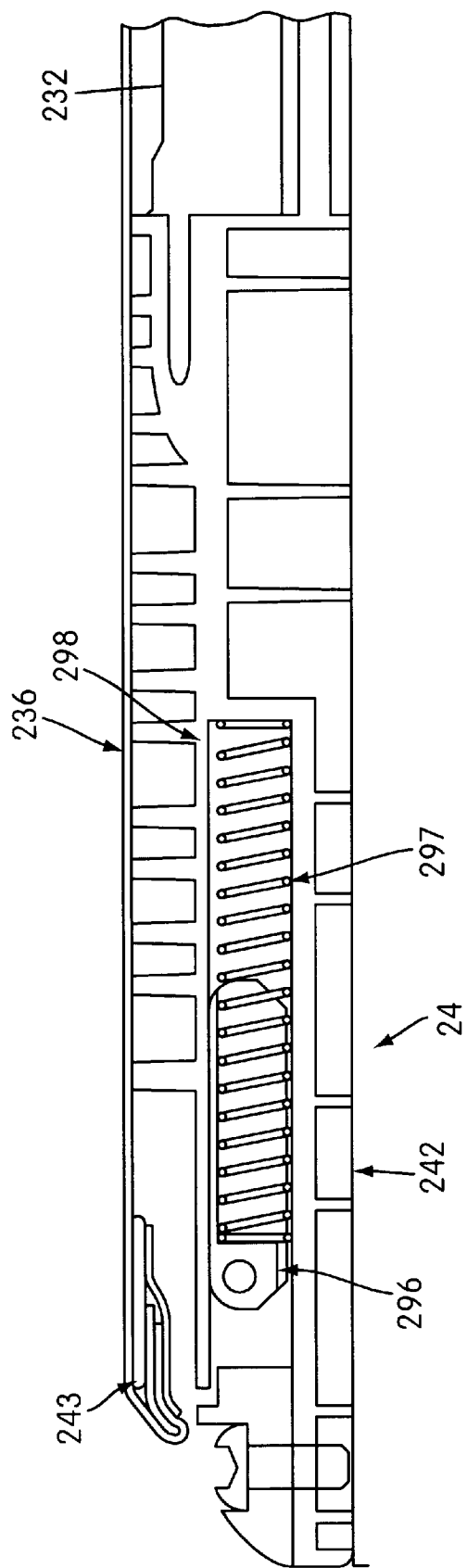
FIG. 29 is a cross-sectional view of the cover tensioner shown in FIG. 28.

As shown in FIG. 17, the proximal support member 241 includes a support member 290 having first and second end portions 292, 294 mountable to respective sliding members 296. The sliding members 296 are similar to sliding members 262 and 288. As shown in FIG. 28, corner members 243 are rigidly secured to corresponding end portions 292, 294 of the support member 290 by fasteners, for example. The corner members 243 have pins 249 that are received within corresponding openings 295 in the sliding members 296. The sliding members 296 are slidably mounted on a sliding portion 298 of the first and second track members 230, 232 that provides a predetermined range of movement for the sliding members 296. As shown in FIG. 29, a biasing member 297, such as a spring, is positioned within the portion 298 of the first and second track members 230, 232 to apply a biasing force to the sliding members 296 in a direction away from the distal support member 240, as will be further discussed. A cover plate 299 secures each sliding member 296 and biasing member 297 within the portion 298 of respective first and second track members 230, 232. FIGS. 26–27 show another embodiment in which the sliding members 296 have a pin 245 and a single opening 295. The pin 245 is mountable within an opening (not shown) provided in respective corner members 243 and the opening 295 is configured to receive a single pin 249 provided in the corner members 243.

Figure 30:
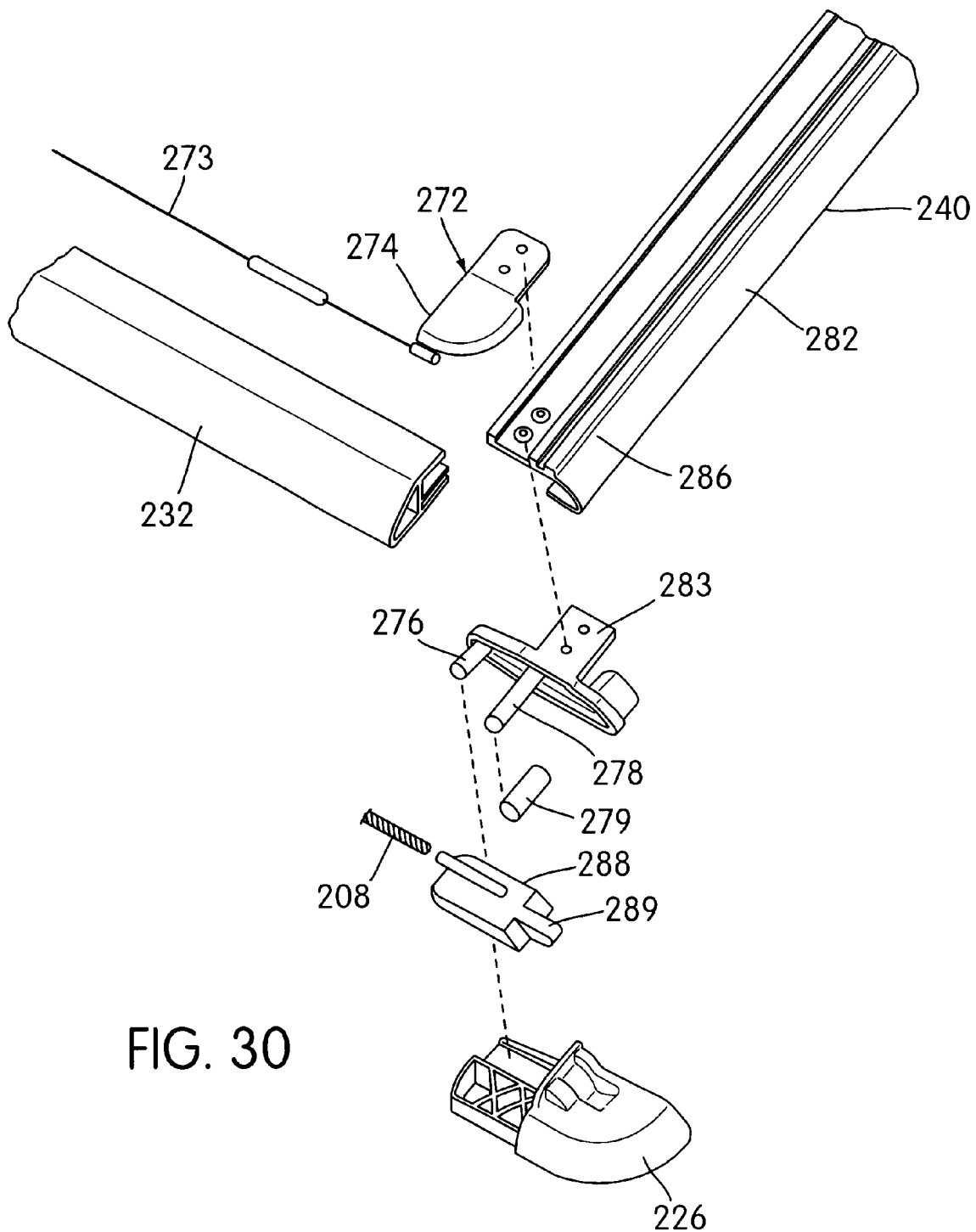
FIG. 30 is an enlarged perspective view showing the distal support member of the cover assembly shown in FIG. 17.
Figure 35:
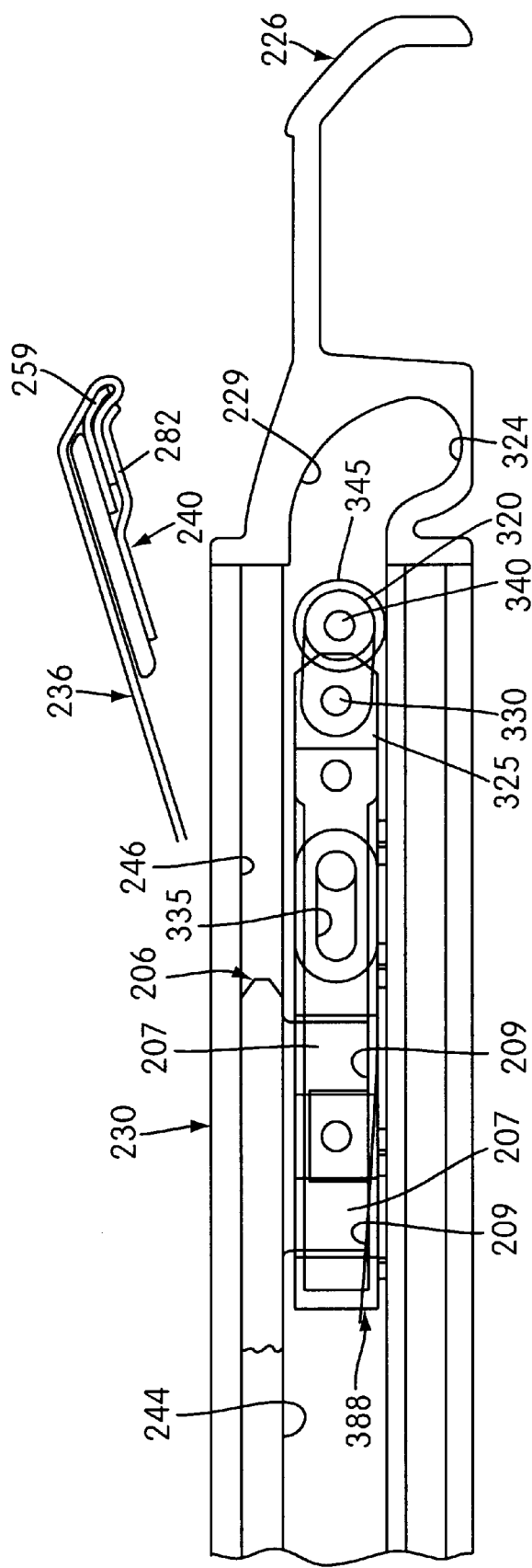
FIG. 35 is a cross-sectional view illustrating the distal support member of FIG. 34 being moved to a cover tensioning position.
Figure 36:
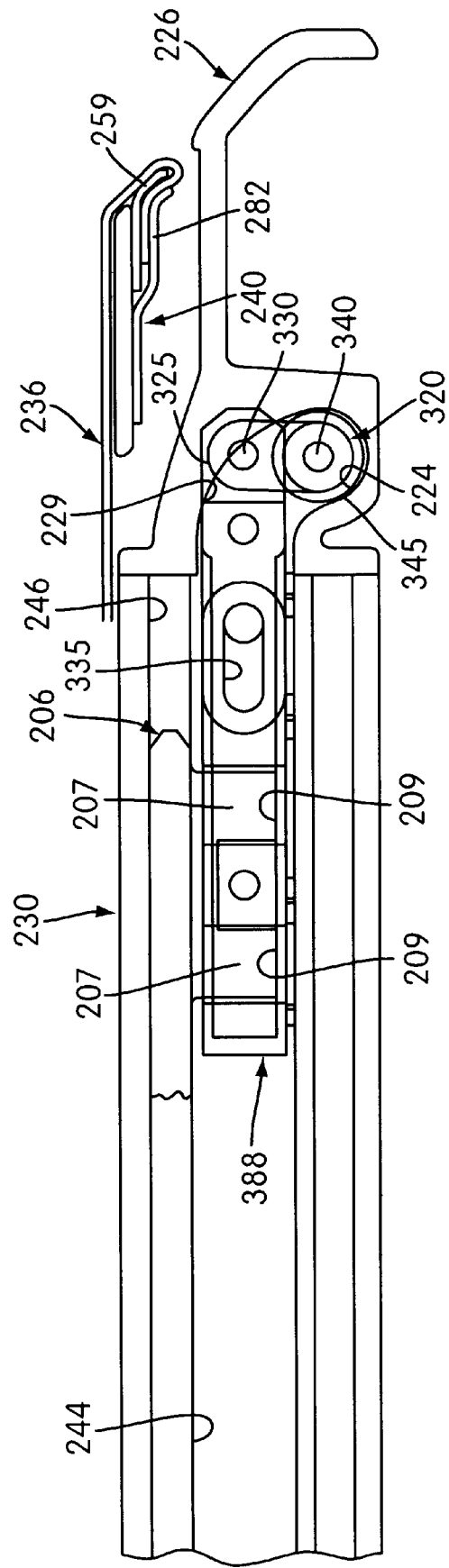
FIG. 36 is a cross-sectional view illustrating the distal support member of FIG. 34 in the cover tensioning position.

The flexible cover 236 is secured to each of the plurality of transverse support members 234 and 254 including the distal and proximal support members 240, 241. As shown in FIGS. 22 and 35–36, mounting members 259, such as brackets or dowels, are sewn into distal and proximal edges 268, 269 of the cover 236. The mounting members 259 are then securely mounted to respective distal and proximal support members 282, 290 to securely fasten the mounting members 259 and hence the distal and proximal edges 268, 269 of the cover 236 to the distal and proximal support members 282, 290, respectively. The cover 236 may be securely fastened to each of the support members 234 and 254 in a similar manner. Further, the side edges 270, 271 of the cover 236 are secured to a cable assembly 272. FIG. 18 illustrates the edge 270 of the cover 236 secured to a cable 273 of the cable assembly 272. As shown in FIGS. 17, 28, and 30, opposing ends of the cable 273 have corner plates 274, 275 attached thereto. One corner plate 274 is fixedly secured to the distal support member 240 and the other corner plate 275 is fixedly secured to the proximal support member 241. As a result, the cable 273 facilitates holding down the side edges 270, 271 of the cover 236 against respective track members 230, 232 (as shown in FIG. 18) so the interior space 28 of the vehicle bed 12 is not exposed to the environment.

The support members 234 and the distal support member 240 are movably arranged on the first and second track members 230, 232 such that movement of the distal support member 240 in the opening direction towards the front end wall 18 causes the distal support member 240 to push each of the other support members 234 in a sequential manner in the opening direction and hence sequentially collapses the cover 236 secured thereto, thereby facilitating access to the interior space 28 of the vehicle bed 12. Movement of the distal support member 240 along the first and second track members 230, 232 in the closing direction towards the rear end wall 20 causes the distal support member 240 to pull the other support members 234 in a sequential manner in the closing direction and hence sequentially moves the cover 236 secured thereto into covering relation to the interior space 28 of the vehicle bed 12.

Figure 23:
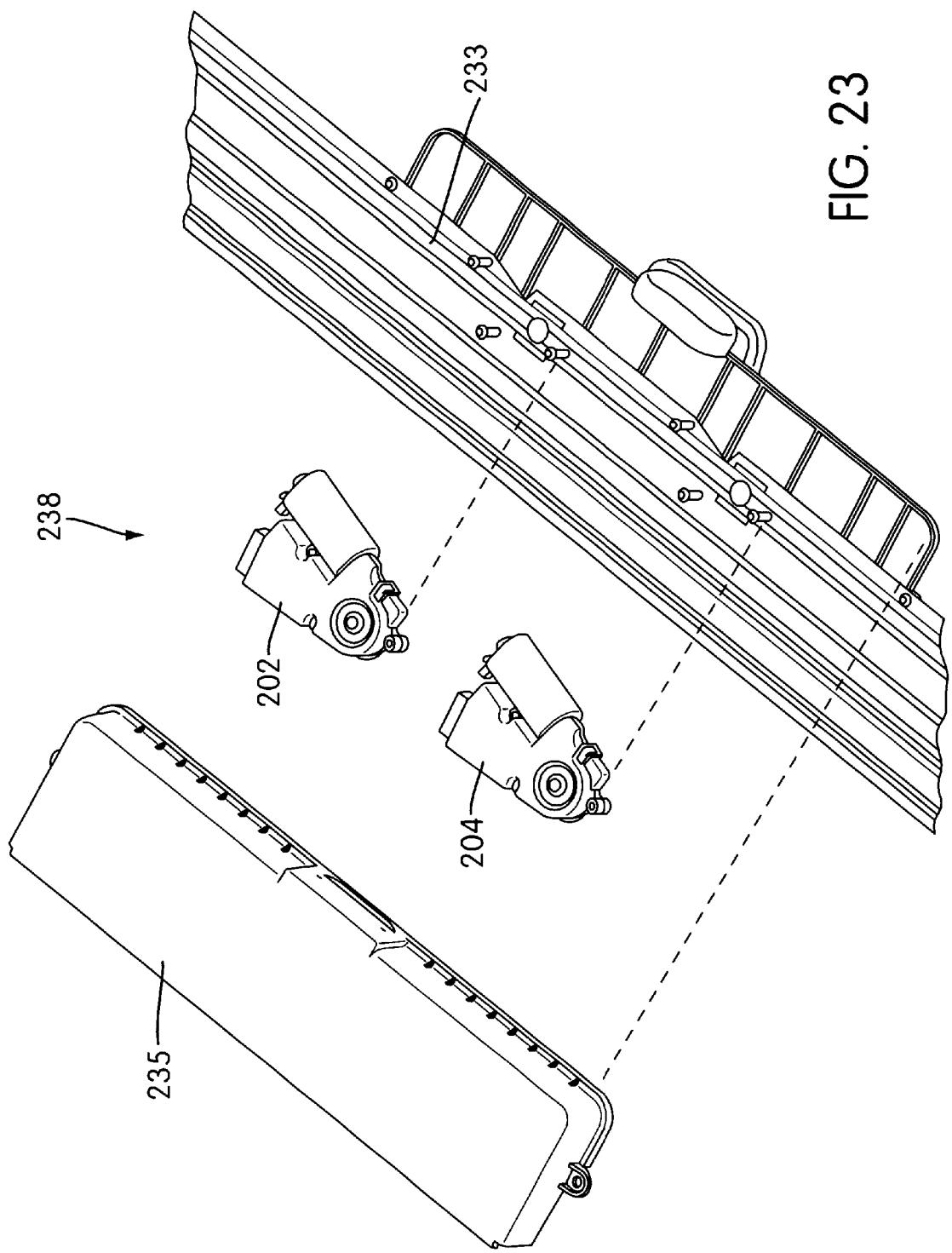
FIG. 23 is an enlarged perspective view showing the motor of the cover assembly shown in FIG. 17.
Figure 24:
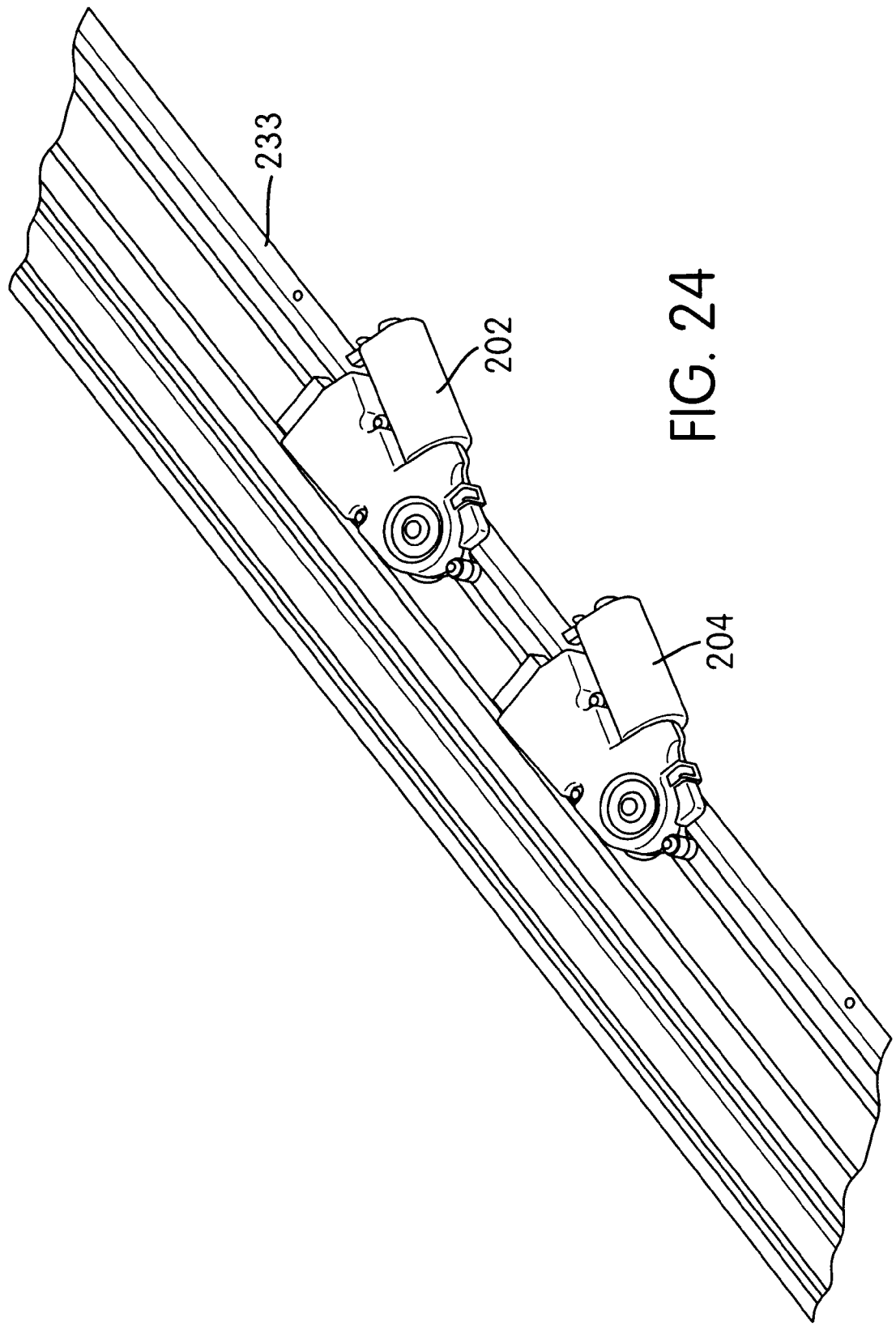
FIG. 24 is another enlarged perspective view showing the motor of the cover assembly shown in FIG. 17.
Figure 25:
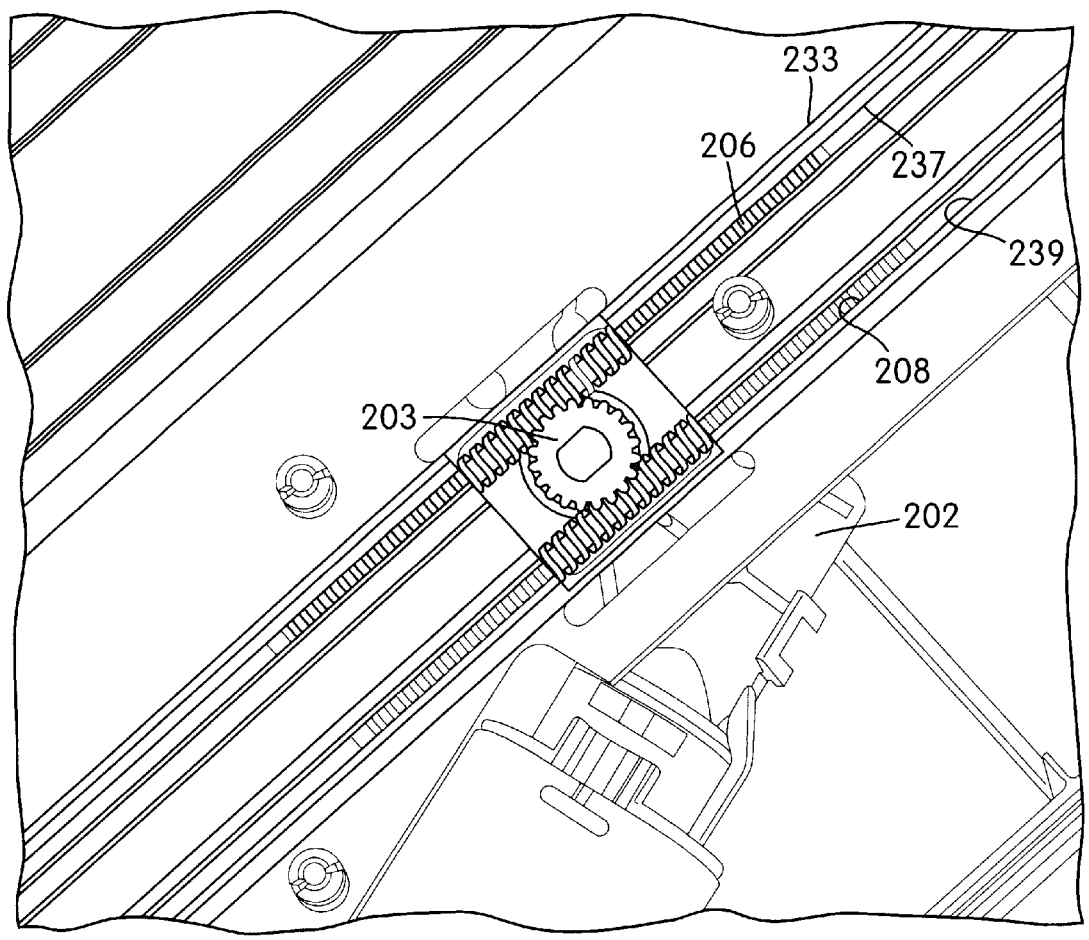
FIG. 25 is a bottom view of a motor unit of the motor illustrating a gear of the motor unit intermeshed with drive cables of the cover assembly.

The motor 238 is operatively connected to the distal support member 240 to selectively move the distal support member 240 in the opening and closing directions. As shown in FIGS. 23–24, the motor 238 includes a pair of reversible motor units 202, 204 rigidly mounted to a mounting structure 233 that interconnects the first and second track members 230, 232. A cover 235 encloses the motor units 202, 204. As shown in FIG. 25, a gear 203 is operatively connected to each of the motor units 202, 204. The motor units 202, 204 are activatable to rotate the gear 203 in opposing rotational directions.

Referring to FIG. 25, the motor units 202, 204 work in series to drive a pair of flexible drive cables 206, 208 that are operatively connected thereto. Specifically, the cables 206, 208 are received within respective conduits 246, 247 provided in the first and second track members 230, 232. Conduits 237, 239 are also provided in the mounting structure 233 and align with the conduits 246, 247 provided in the first and second track members 230, 232. The cables 206, 208 have a distal end portion connected to respective sliding members 288 of the distal support member 240 through the longitudinally extending slot 248 of the conduits 246, 247 to enable movement of the cables 206, 208 within the conduits 246, 247 to move the distal support member 240 in the opening and closing directions. Specifically, one cable 206 is secured to one of the sliding members 288 of the distal support member 240 and the other cable 208 is secured to the other of the sliding members 288. FIG. 18 illustrates the cable 206 secured to one of the sliding members 288. As shown in FIGS. 18 and 31–33, the cable 206 has extensions 207 secured thereto that are received within corresponding slots 209 provided in the sliding member 288. The cable 208 is secured to the other sliding member 288 of the distal support member 240 in a similar manner.

As shown in FIG. 25, the cables 206, 208 are engaged with the gear 203 operatively connected to each of the motor units 202, 204 in intermeshed relation such that (a) rotation of the gear 203 by respective motor units 202, 204 in a first rotational direction pushes the cables 206, 208 in a distal direction within respective conduits 246, 247 to push the distal support member 240 in the closing direction and (b) rotation of the gear 203 in a second rotation direction pulls the cables 206, 208 in a proximal direction within respective conduits 246, 247 to pull the distal support member 240 in the opening direction. The cables 206, 208 may have a helical configuration in order to engage the gear in intermeshed relation.

Referring to FIG. 18, rotation of the gear 203 pushes/pulls the cable 206 within the drive conduit 246 to drive the sliding member 288 within the track member 230. The cable 208 (not visible in FIG. 18) in the return conduit 247 is connected to the sliding member 288 within the track member 232 and moves in the opposite direction of the cable 206 during rotation of the gear 203. The drive and return conduits 246, 247 are in reversed positions within the track member 232. Specifically, the conduit 246 of track member 232 becomes a return conduit for cable 206 and the conduit 247 becomes a drive conduit for cable 208.

The cables 206, 208 are positioned under the cover 236 at an upper portion of the first and second track members 230, 232 so that the cables 206, 208 are not exposed to the environment, as shown in FIG. 18. Further, the sliding members 288 of the distal support member 240 has a sloping structure 289 at the forward end thereof (as shown in FIG. 30), which can sweep out dust and debris from respective first and second track members 230, 232 during opening and closing movements of the cover 236.

It is contemplated that a single motor unit may be used to drive the pair of cables 206, 208. Similar to the above, it is contemplated that the motor may drive a single cable connected to only one of the sliding members 288 of the distal support member 240.

The proximal support member 241 constitutes a cover tensioner. As aforesaid, the proximal support member 241 includes sliding members 296 that are biased by a biasing structure 297 in a direction away from the distal support member 240. As a result, the biasing structure 297 applies a tensioning force to the support member 290 and hence to the cover 236 in a direction away from the distal support member 240 to thereby maintain tension in the cover 236. This feature helps to reduce the motor force required to keep the cover taut. This feature also helps compensate for temperature differences which tend to alter the length of the cover 236 due to shrinkage, etc. Thus, the motor 238 must overcome the biasing force of the biasing member 297 to move the cover 236 to the closed and cover tensioning position rather than overcoming various tensions in the cover 236, which can become significantly high depending on the temperature.

Similar to the previous embodiment, the distal support member 240 is constructed and arranged to retain the cover 236 in tension when the cover 236 is moved to a fully closed position. The distal support member 240 is adjacent the rear end wall 20 when the cover 236 is in a fully closed position.

Figure 31:
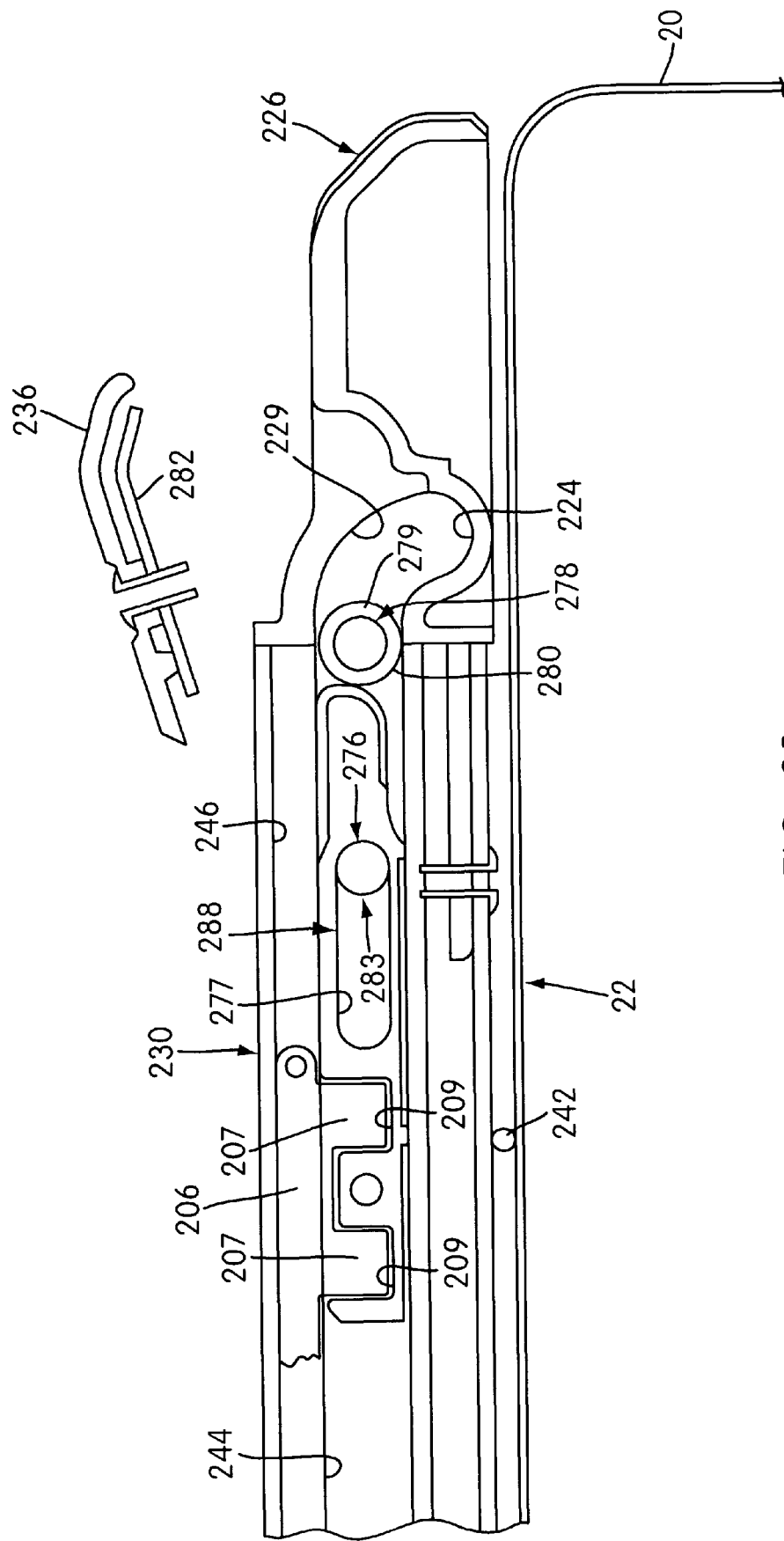
FIG. 31 is a cross-sectional view illustrating the distal support member being moved to a cover tensioning position.

As shown in FIG. 30, corner members 283 are rigidly secured to corresponding end portions 284, 286 of the support member 282 by fasteners, for example. Each corner member 283 has a pair of pins 276, 278. One of the pins 276 is rotatably mounted within an elongated opening 277 provided in the sliding member 288. The other pin 278 includes a bushing 279 that provides a load transmitting surface 280 on the periphery thereof, as will be further discussed. As shown in FIG. 31, the pin 278 is positioned rearward of the sliding member 288 within the track member 230.

Each of the first and second track members 230, 232 has a corresponding end cap 226 mounted thereto by fasteners. Specifically, as shown in FIG. 18, the end caps 226 are secured to respective first and second track members 230, 232 by rivets 227. The end caps 226 are positioned adjacent the rear end wall 20 and provide a sliding member opening 229 that aligns with respective sliding member openings 244 provided in the first and second track members 230, 232. The sliding member opening 229 has a generally downwardly extending arcuate path with respect to the first and second track members 230, 232. The sliding member opening 229 provides a load bearing surface 224, as will be further discussed.

Figure 32:
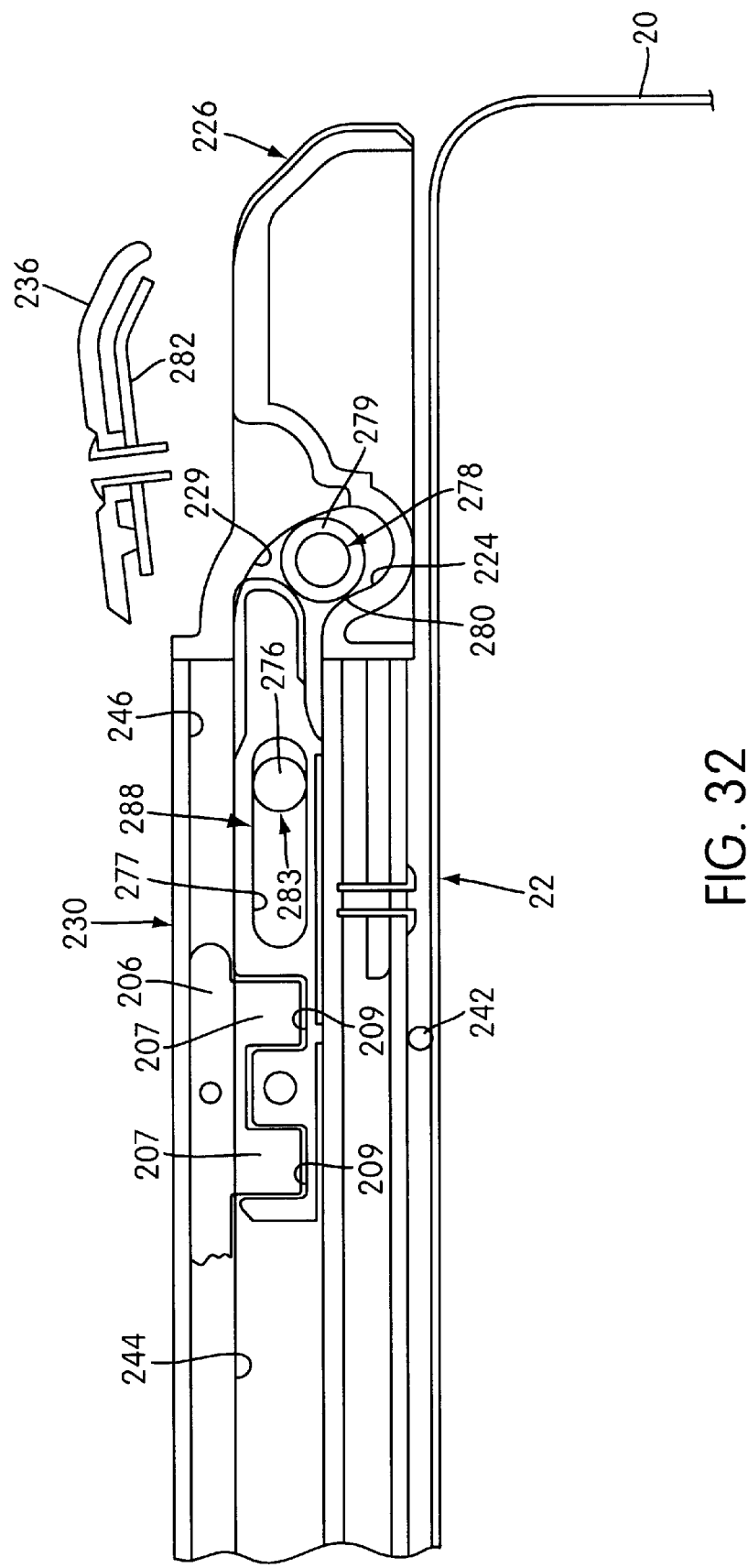
FIG. 32 is a cross-sectional view illustrating the distal support member being pivoted to a cover tensioning position.
Figure 33:
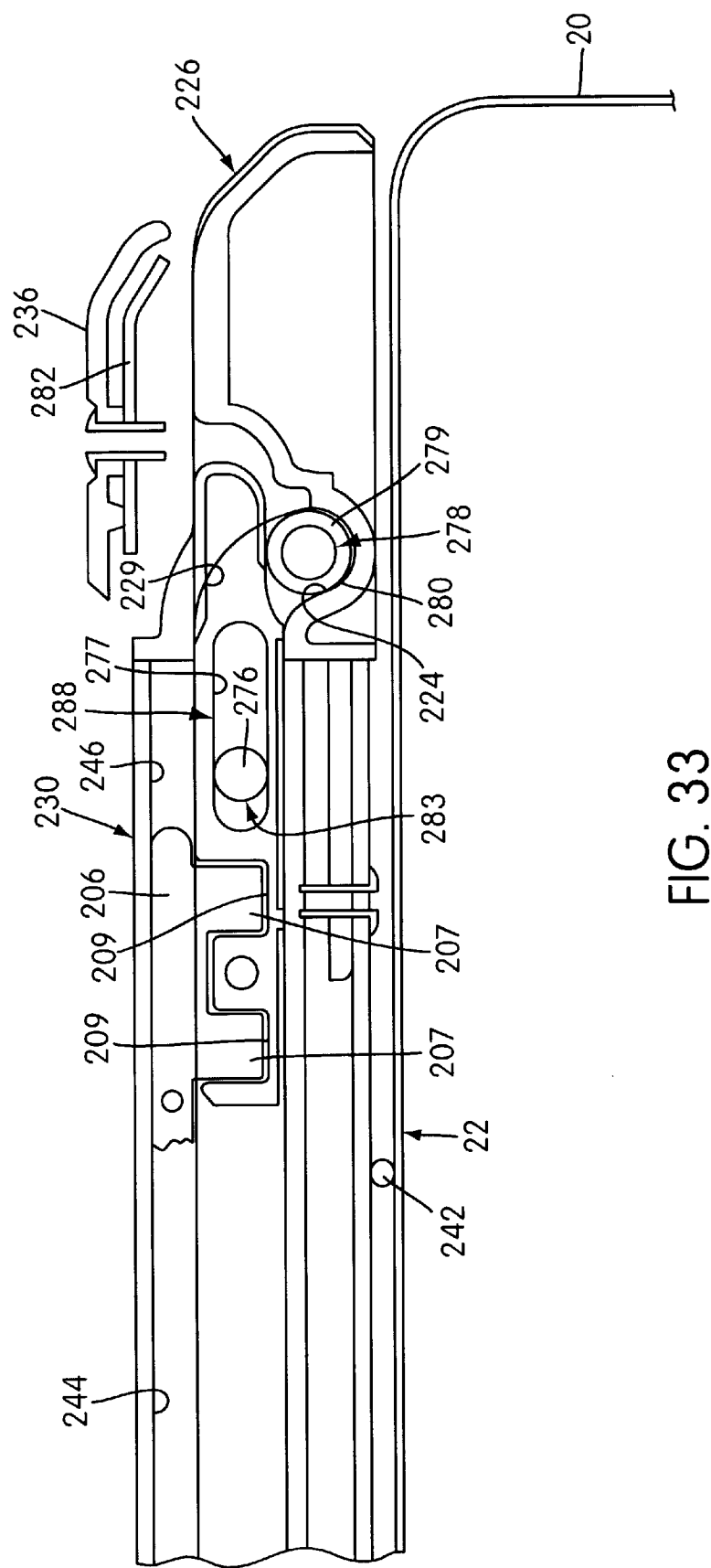
FIG. 33 is a cross-sectional view illustrating the distal support member in the cover tensioning position.

FIGS. 31–33 illustrate the distal support member 240 being moved to the fully closed position and then pivoted to the closed or cover tensioning position. As shown in FIG. 31, the corner member 283 and support member 282 thereof move horizontally along the track member 230 due to its connection with the sliding member 288. The support member 282 rides above upper surfaces of the first and second track members 230, 232 due to the positioning of the pins 276, 278 on the corner members 283. In FIG. 32, as the sliding members 288 continue to move in the closing direction, the corner members 283 pivot the support member 282 in a direction towards the rear end wall 20. Specifically, as the corner members 283 continue along respective first and second track members 230, 232, the pin 278 and bushing 279 of each corner member 283 enter respective sliding member openings 229 in the end caps 226 and ride down the arcuate path thereof. The arcuate path guides the pin 278 and bushing 279 thereof downwardly, thus pivoting the corner members 283 relative to respective sliding members 288 and hence pivoting the support member 282 downwardly towards the first and second track members 230, 232. The continued rearward and downward pivotal movement stretches the cover 236 and activates the proximal support member or cover tensioner 241. Specifically, as the distal support member 240 moves toward the closed position, the tension in the cover 236 pulls the sliding member 288 of the cover tensioner 241 towards the rear end wall 20 against the bias of the biasing member 297. As aforesaid, the biasing force of the biasing member 297 aids in tensioning the cover 236.

The corner members 283 continue to pivot relative to respective sliding members 288 until the pin 278 and bushing 279 thereof engage the end of the arcuate path. Because the pin 276 is received within an elongated opening 277 within the sliding member 288, the sliding member 288 continues to move horizontally relative to the pins 276, 278 with the rearward end of the sliding member 288 riding over the pin 278. This relative movement continues until the rearward end of each of the sliding members 288 engage the back wall of respective end caps 226. As shown, the rearward end of the sliding member 288 is positioned over the pin 278 to prevent withdrawal of the pin 278 from the end of the arcuate path. As a result, the corner members 283, and hence the support member 282, is pivoted to a cover tensioning or locked position which prevents the distal support member 240 from movement in the opening direction.

Moreover, the load bearing and transmitting surfaces 223, 280 are positioned and configured such that when the distal support member 240 is in the fully closed and cover tensioning position as shown in FIG. 33, the load transmitting surface 280 provided by the bushing 279 on the pin 278 engages the load bearing surface 224 of the end caps 226 so that a tension force applied in the opening direction to the distal support member 240 by the cover 236 is transmitted to and borne by the load bearing surfaces 224 thereby preventing the distal support member 240 from movement in the opening direction.

As a result, the corner members 283 and pins 276, 278 thereof bear the tension force from the cover 236, thus removing the tension force from the cables 206, 208 and hence the motor 238. Specifically, the pin 278 moves to a position which is off-center from the sliding member opening 244 such that the tension force is applied to the load bearing surface 224 of the end cap 226. Therefore, the motor 238 is not required to apply resistance to maintain the distal support member 240 in the closed or cover tensioning position.

Figure 34:
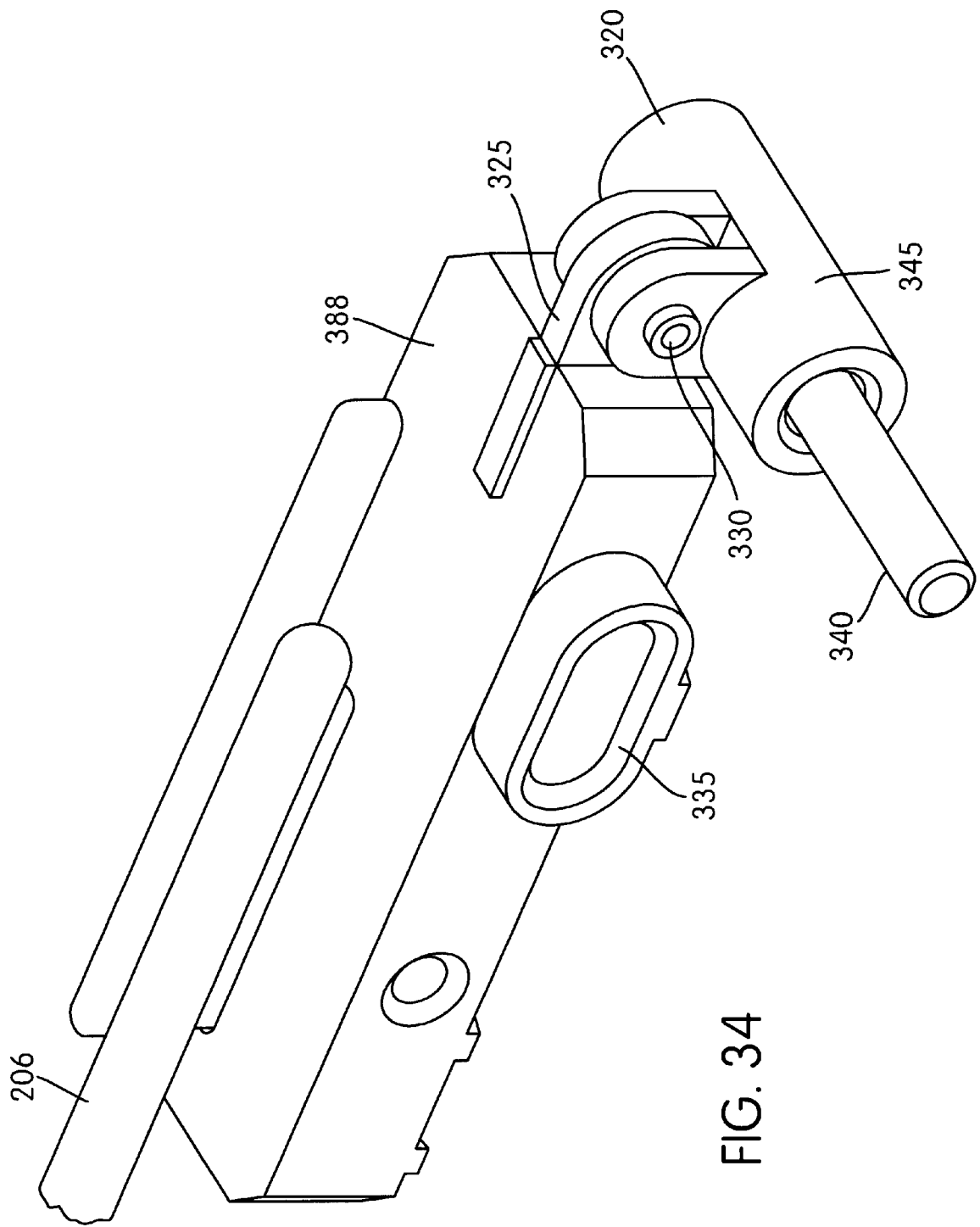
FIG. 34 is a perspective view of another embodiment of the sliding member of the distal support member.

FIGS. 34–36 illustrate another embodiment of the sliding member 288 of the distal support member 240. In this embodiment, the sliding member, indicated as 388, has a link member 320 pivotally mounted thereto.

As shown in FIG. 34, the sliding member 388 has an extension 325 rigidly mounted to a rearward end of the sliding member 388. The link member 320 is pivotally mounted to the extension 325 with a pivot pin 330. The sliding member 388 also includes an elongated opening 335. Similar to the above, corner members 283 are rigidly secured to the end portions 284, 286 of the support member 282 by fasteners, for example. Each corner member 283 includes a pin and an opening (not shown). The pin of the corner members 283 is slidably mounted within the elongated opening 335 of respective sliding members 388. The opening in the corner members 283 is adapted to receive a pin 340 provided on respective link members 320. As a result, the corner members 283 and support member 282 thereof may pivot relative to the sliding member 388. The link member 320 provides a load transmitting surface 345 on the periphery thereof, as will be further discussed.

FIGS. 35–36 illustrate the distal support member 240 being moved to the fully closed position and then pivoted to the cover tensioning position. As shown in FIG. 35, the corner members 283 and support member 282 thereof move horizontally along respective track members 230, 232 due to its connection with the sliding member 388. In FIG. 36, as the sliding members 396 continue to move in the closing direction, the corner members 283 pivot the support member 282 in a direction towards the rear end wall 20. Specifically, as the corner members 283 continue along respective first and second track members 230, 232, the link member 320 enters the sliding member opening 229 in the end caps 226 and rides down the arcuate path thereof. The arcuate path guides the link member 320 downwardly, thus pivoting the corner members 283 relative to the sliding member 388 and hence pivoting the support member 282 downwardly towards the track members 230, 232. Similar to the above, the continued rearward and downward pivotal movement stretches the cover 236 and activates the cover tensioner 241 to aid in tensioning the cover 236.

The link member 320 continues to pivot relative to the sliding member 388 until the link member 320 engages the end of the arcuate path. Because the pin of the corner members 283 is received within the elongated opening 335 within the sliding member 388, the sliding member 388 moves relative to the pin as the link member 320 pivots downwardly within the arcuate path.

When the distal support member 240 reaches the cover tensioning position as shown in FIG. 36, the load transmitting surface 345 provided by the link member 320 engages the load bearing surface 224 of the end caps 226 so that a tension force applied in the opening direction to the distal support member 240 by the cover 236 is transmitted to and borne by the load bearing surface 224 thereby preventing the distal support member 240 from movement in the opening direction.

It is contemplated that the cover assembly 10 or 200 may be mounted to the vehicle bed 12 such that the distal support member 40 or 240 is adjacent the front end wall 18 when in the fully closed position, the distal support member 40 or 240 being movable towards and away the front end wall 18 to effect covering and collapsing movements respectively. It is also contemplated that the first and second track members 30, 32 or 230, 232 may be mounted on the front and rear end walls 18, 20 such that the cover assembly 10 or 200 moves transverse to the longitudinal extent of the vehicle 16. It is also contemplated that the vehicle bed 12 may be partitioned with a removable wall such that the cover assembly 10 or 200 may be operable to cover only a portion of the vehicle bed 12.

Figure 14:
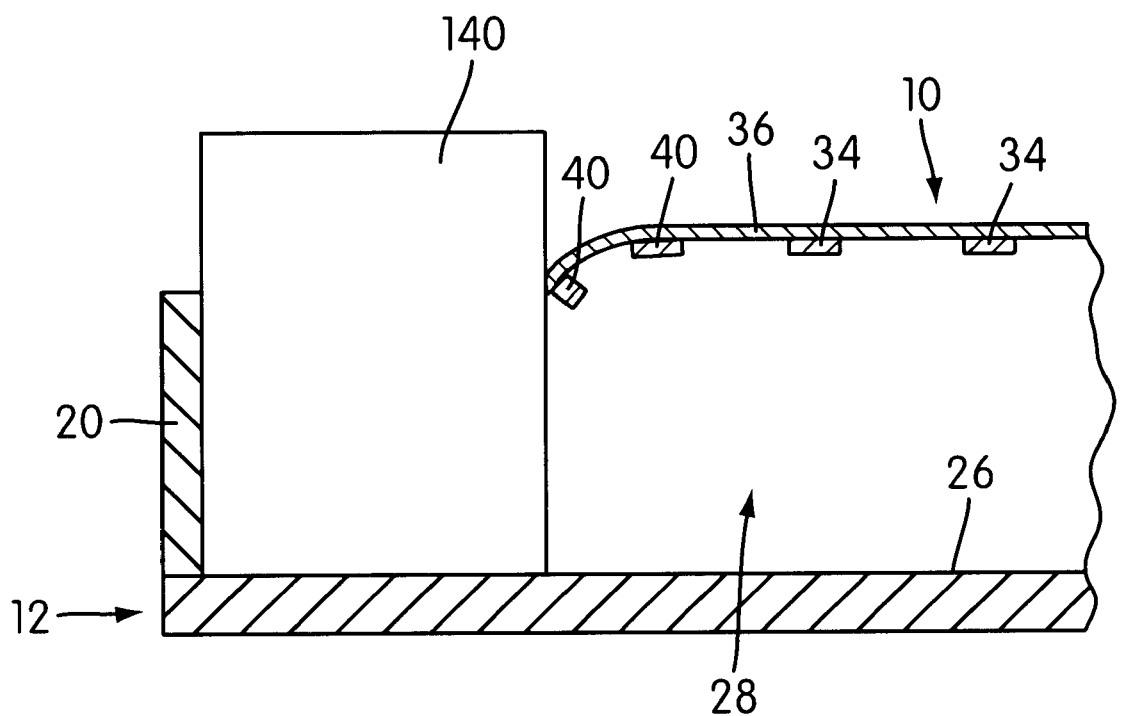
FIG. 14 is a cross-sectional view illustrating the cover assembly securing an object in the vehicle bed.

An advantage of the cover assembly 10 or 200 of the present invention is that the cover assembly 10 or 200 can secure an object, such as a box 140, from moving in the vehicle bed 12 in abutting relation against one of the front and rear end walls 18, 20 by operating the motor 38 or 238 to hold the object 140 against the one end wall with the distal support member 40 or 240, as shown in FIG. 14. Specifically, the motor 38 or 238 may include an electronic brake to hold the distal support member 240 in the plurality of intermediate closed positions. Thus, tension is put on the box 140 to prevent shifting while the vehicle 16 is driven.

Another advantage of the cover assembly 10 or 200 of the present invention is that the cover 36 or 236 is secured to the support members 34 or 234 (including the support members 282 in one embodiment) such that the outer edges of the cover 36 or 236 overhang outer surfaces of the first and second side walls 22, 24 and front and rear end walls 18, 20. Thus, the cover assembly 10 or 200 prevents intrusion of foreign matter into the interior space 28 of the vehicle bed 12. For example, water will be directed away from the interior space 28 and prevented from intrusion therein.

It is contemplated that an obstruction detection system may be operatively connected to the motor 38 or 238. The detection system may de-activate the motor 38 or 238 or reverse the direction of the motor 38 or 238 when the detection system detects obstruction of movement of the cover assembly 10 or 200 in the opening or closing direction. Detecting obstruction may be accomplished by monitoring the motor's current for an excessively high resistance, which is indicative of obstruction.

The cover assembly 10 or 200 is adapted to be re-sized to accommodate various size vehicle beds both in length and width. The cover assembly 10 or 2001 is also adapted to accommodate non-parallel vehicle beds. Moreover, the cover assembly 10 or 200 is removably mounted to the vehicle bed 12 such that the cover assembly 10 or 200 may be removed for vehicle modifications (e.g., painting, trim, and hardware) and storage.

It can thus be appreciated that the objectives of the present invention have been fully and effectively accomplished. The foregoing specific embodiments have been provided to illustrate the structural and functional principles of the present invention and are not intended to be limiting. To the contrary, the present invention is intended to encompass all modifications, alterations, and substitutions within the spirit and scope of the appended claims.

What is claimed is:

1. A cover assembly for a vehicle bed having front and rear end walls, first and second side walls between the front and rear end walls, and a floor, the first and second side walls, the front and rear end walls, and the floor defining an interior space therebetween, the cover assembly comprising:

first and second elongated track members, the first track member being mountable to the first side wall and the second track member being mountable to the second side wall;

a plurality of transverse support members, each of the plurality of support members having first and second end portions, the first end portions being mountable on the first track member and the second end portions being mountable on the second track member to enable the support members to be moved in opposing opening and closing directions along the first and second track members, respectively;

a flexible cover secured to each of the plurality of transverse support members; the support members being movably arranged on the first and second track (members such that (1) movement of a distal one of the support members in the opening direction causes the distal support member to push each of the other support members in a sequential manner in the opening direction and hence sequentially collapses the cover secured thereto, thereby facilitating access to the interior space of the vehicle bed, and (2) movement of the distal support member in the closing direction causes the distal support member to pull the other support members in a sequential manner in the closing direction and hence sequentially moves the cover secured thereto into covering relation to the interior space of the vehicle bed, thereby inhibiting access to the interior space of the vehicle bed;

a reversible motor;

a gear operatively connected to the motor, the motor being activatable to rotate the gear in opposing rotational directions;

a drive cable conduit extending longitudinally along the first elongated track member, the drive cable conduit having a longitudinally extending slot; and a flexible drive cable received within the conduit and having a distal end portion connected to the distal one of the support members through the longitudinally extending slot to enable movement of the cable within the conduit to move the distal support member in the opening and closing directions, the cable being engaged with the gear in intermeshed relation such that (a) rotation of the gear by the motor in a first rotational direction pushes the cable in a distal direction within the conduit to push the distal support member in the closing direction and (b) rotation of the gear in a second rotation direction pulls the cable in a proximal direction within the conduit to pull the distal support member in the opening direction.

2. A cover assembly according to claim 1, wherein the motor is operable to move the distal support member between (1) a fully closed position wherein the flexible cover is positioned in fully covering relation with respect to the interior space of the vehicle bed, (2) a fully open position wherein the flexible cover is fully collapsed to permit substantially full access to the interior space of the vehicle bed, and (3) at least one intermediate position wherein the flexible cover is positioned in partially covering relation with respect to the interior space of the vehicle thereby covering a portion of the interior space of the vehicle bed and permitting access to another portion of the interior space.

3. A cover assembly according to claim 1, wherein the first and second end portions of each of the support members include respective first and second sliding members secured thereto, the first and second sliding members being slidably mounted on respective first and second track members.

4. A cover assembly according to claim 1, further comprising a plurality of fold initiating mechanisms mounted between each pair of adjacent support members, each of the fold initiating mechanisms having a portion that engages an adjacent portion of the cover between an associated pair of adjacent support members so as to initiate folding of the adjacent portion in a predetermined direction as one of the associated pair of adjacent support members is being moved towards the other of the associated pair in the opening direction.

5. A cover assembly according to claim 4, wherein each fold initiating mechanism comprises:

a flipper member pivotable upwardly to engage the adjacent portion of the cover so as to initiate folding of the adjacent portion in the predetermined direction; and a biasing member operatively connected to the flipper member to bias the flipper member upwardly.

6. A cover assembly according to claim 5, wherein each fold initiating mechanism comprises a pair of said flipper members and a pair of said biasing members.

7. A cover assembly according to claim 6, wherein each fold initiating mechanism comprises a transverse member extending between the pair of flipper members.

8. A cover assembly according to claim 7, wherein the flipper members are pivotally mounted to the support members.

9. A cover assembly according to claim 1, further comprising a cover tensioner secured to a proximal end of the cover opposite the distal support member, the cover tensioner including a biasing member constructed and arranged to apply a tensioning force to the cover in a direction away from the distal support member to thereby maintain tension in the cover.

10. A cover assembly according to claim 1, wherein the motor includes a pair of reversible motor units, each motor unit having a gear and being activatable to rotate the gear in opposing rotational directions.

11. A cover assembly according to claim 1, further comprising a second drive cable received within a second cable conduit provided within the second track member, the first and second drive cables being engaged with the gear such that (a) rotation of the gear by the motor in a first rotational direction pushes the first and second cables in a distal direction within respective conduits to push the distal support member in the closing direction and (b) rotation of the gear in a second rotation direction pulls the first and second cables in a proximal direction within respective conduits to pull the distal support member in the opening direction.

12. A cover assembly according to claim 1, wherein the distal support member is adjacent the rear end wall when the cover is in a fully closed position, the distal support member providing a load transmitting surface and the first and second track members providing a load bearing surface that is engagable with the load transmitting surface, said load bearing and transmitting surfaces being positioned and configured such that when said distal support member is in said fully closed position the load transmitting surface engages the load bearing surface so that a tension force applied in the opening direction to the distal support member by the cover is transmitted to and borne by the load bearing surface of the track members thereby preventing the distal support member from movement in the opening direction.

13. A cover assembly according to claim 12, wherein the distal support member is pivotally mountable to the first and second track members respectively, wherein each of the first and second track members provide an arcuate path adjacent the rear end wall, the distal support member configured and positioned to pivot, when moved in the closing direction along the arcuate path, in a direction towards the rear end wall to the fully closed position with the load transmitting surface provided by the distal support member engaging the load bearing surface provided by the arcuate path of the track members.

14. A cover assembly for a vehicle bed having front and rear end walls, first and second side walls between the front and rear end walls, and a floor, the first and second side walls, the front and rear end walls, and the floor defining an interior space therebetween, the cover assembly comprising:

first and second elongated track members, the first track member being mountable to the first side wall and the second track member being mountable to the second side wall;

a plurality of transverse support members, each of the plurality of support members having first and second end portions, the first end portions being mountable on the first track member and the second end portions being mountable on the second track member to enable the support members to be moved in opposing opening and closing directions along the first and second track members, respectively;

a flexible cover secured to each of the plurality of transverse support members, the support members being movably arranged on the first and second track members such that (1) movement of a distal one of the support members in the opening direction causes the distal support member to push each of the other support members in a sequential manner in the opening direction and hence sequentially collapses the cover secured thereto, thereby facilitating access to the interior space of the vehicle bed, and (2) movement of the distal support member in the closing direction causes the distal support member to pull the other support members in a sequential manner in the closing direction and hence sequentially moves the cover secured thereto into covering relation to the interior space of the vehicle bed, thereby inhibiting access to the interior space of the vehicle bed;

a motor operatively connected to the distal support member, the motor being activatable to selectively move the distal end support member in the opening and closing directions, a plurality of fold initiating mechanisms mounted between each pair of adjacent support members, each of the fold initiating mechanisms having a portion that engages an adjacent portion of the cover between an associated pair of adjacent support members so as to initiate folding of the adjacent portion in a predetermined direction as one of the associated pair of adjacent support members is being moved towards the other of the associated pair in the opening direction, wherein the motor is a reversible motor including:

a gear operatively connected to the motor, the motor being activatable to rotate the gear in opposing rotational directions;

a drive cable conduit extending longitudinally along the first elongated track member, the drive cable conduit having a longitudinally extending slot; and a flexible drive cable received within the conduit and having a distal end portion connected to the distal one of the support members through the longitudinally extending slot to enable movement of the cable within the conduit to move the distal support member in the opening and closing directions, the cable being engaged with the gear in intermeshed relation such that (a) rotation of the gear by the motor in a first rotational direction pushes the cable in a distal direction within the conduit to push the distal support member in the closing direction and (b) rotation of the gear in a second rotation direction pulls the cable in a proximal direction within the conduit to pull the distal support member in the opening direction.

15. A cover assembly according to claim 14, wherein the motor includes a pair of reversible motor units, each motor unit having a gear and being activatable to rotate the gear in opposing rotational directions.

16. A cover assembly according to claim 14, further comprising a second drive cable received within a second cable conduit provided within the second track member, the first and second drive cables being engaged with the gear such that (a) rotation of the gear by the motor in a first rotational direction pushes the first and second cables in a distal direction within respective conduits to push the distal support member in the closing direction and (b) rotation of the gear in a second rotation direction pulls the first and second cables in a proximal direction within respective conduits to pull the distal support member in the opening direction.

17. A cover assembly according to claim 14, wherein the motor is operable to move the distal support member between (1) a fully closed position wherein the flexible cover is positioned in fully covering relation with respect to the interior space of the vehicle bed, (2) a fully open position wherein the flexible cover is fully collapsed to permit substantially full access to the interior space of the vehicle bed, and (3) at least one intermediate position wherein the flexible cover is positioned in partially covering relation with respect to the interior space of the vehicle thereby covering a portion of the interior space of the vehicle bed and permitting access to another portion of the interior space.

18. A cover assembly according to claim 14, wherein the first and second end portions of each of the support members include respective first and second sliding members secured thereto, the first and second sliding members being slidably mounted on respective first and second track members.

19. A cover assembly according to claim 14, wherein each fold initiating mechanism comprises:
   a flipper member pivotable upwardly to engage the adjacent portion of the cover so as to initiate folding of the adjacent portion in the predetermined direction; and
   a biasing member operatively connected to the flipper member to bias the flipper member upwardly.

20. A cover assembly according to claim 19, wherein each fold initiating mechanism comprises a pair of said flipper members and a pair of said biasing members.

21. A cover assembly according to claim 20, wherein each fold initiating mechanism comprises a transverse member extending between the pair of flipper members.

22. A cover assembly according to claim 21, wherein the flipper members are pivotally mounted to the support members.

23. A cover assembly according to claim 14, further comprising a cover tensioner secured to a proximal end of the cover opposite the distal support member, the cover tensioner including a biasing member constructed and arranged to apply a tensioning force to the cover in a direction away from the distal support member to thereby maintain tension in the cover.

24. A cover assembly according to claim 14, wherein the distal support member is adjacent the rear end wall when the cover is in a fully closed position,
   the distal support member providing a load transmitting surface and the first and second track members providing a load bearing surface that is engagable with the load transmitting surface, said load bearing and transmitting surfaces being positioned and configured such that when said distal support member is in said fully closed position the load transmitting surface engages the load bearing surface so that a tension force applied in the opening direction to the distal support member by the cover is transmitted to and borne by the load bearing surface of the track members thereby preventing the distal support member from movement in the opening direction.

25. A cover assembly according to claim 24, wherein the distal support member is pivotally mountable to the first and second track members respectively,
   wherein each of the first and second track members provide an arcuate path adjacent the rear end wall, the distal support member configured and positioned to pivot, when moved in the closing direction along the arcuate path, in a direction towards the rear end wall to the fully closed position with the load transmitting surface provided by the distal support member engaging the load bearing surface provided by the arcuate path of the track members.

26. A cover assembly for a vehicle bed having front and rear end walls, first and second side walls between the front and rear end walls, and a floor, the first and second side walls, the front and rear end walls, and the floor defining an interior space therebetween, the cover assembly comprising:
   first and second elongated track members, the first track member being mountable to the first side wall and the second track member being mountable to the second side wall;
   a plurality of transverse support members, each of the plurality of support members having first and second end portions, the first end portions being mountable on the first track member and the second end portions being mountable on the second track member to enable the support members to be moved in opposing opening and closing directions along the first and second track members, respectively;
   a flexible cover secured to each of the plurality of transverse support members,
   the support members being movably arranged on the first and second track members such that (1) movement of a distal one of the support members in the opening direction causes the distal support member to push each of the other support members in a sequential manner in the opening direction and hence sequentially collapses the cover secured thereto, thereby facilitating access to the interior space of the vehicle bed, and (2) movement of the distal support member in the closing direction causes the distal support member to pull the other support members in a sequential manner in the closing direction and hence sequentially moves the cover secured thereto into covering relation to the interior space of the vehicle bed, thereby inhibiting access to the interior space of the vehicle bed;
   a motor operatively connected to the distal support member, the motor being activatable to selectively move the distal end support member in the opening and closing directions; and
   a cover tensioner secured to a proximal end of the cover opposite the distal support member, the cover tensioner including a biasing member constructed and arranged to apply a tensioning force to the cover in a direction away from the distal support member to thereby maintain tension in the cover.

27. A cover assembly according to claim 26, wherein the motor is a reversible motor including:
   a gear operatively connected to the motor, the motor being activatable to rotate the gear in opposing rotational directions;
   a drive cable conduit extending longitudinally along the first elongated track member, the drive cable conduit having a longitudinally extending slot; and
   a flexible drive cable received within the conduit and having a distal end portion connected to the distal one of the support members through the longitudinally extending slot to enable movement of the cable within the conduit to move the distal support member in the opening and closing directions,
   the cable being engaged with the gear in intermeshed relation such that (a) rotation of the gear by the motor in a first rotational direction pushes the cable in a distal direction within the conduit to push the distal support member in the closing direction and (b) rotation of the gear in a second rotation direction pulls the cable in a proximal direction within the conduit to pull the distal support member in the opening direction.

28. A cover assembly according to claim 27, wherein the motor includes a pair of reversible motor units, each motor unit having a gear and being activatable to rotate the gear in opposing rotational directions.

29. A cover assembly according to claim 27, further comprising a second drive cable received within a second cable conduit provided within the second track member, the first and second drive cables being engaged with the gear such that (a) rotation of the gear by the motor in a first rotational direction pushes the first and second cables in a distal direction within respective conduits to push the distal support member in the closing direction and (b) rotation of the gear in a second rotation direction pulls the first and second cables in a proximal direction within respective conduits to pull the distal support member in the opening direction.

30. A cover assembly according to claim 26, wherein the motor is operable to move the distal support member between (1) a fully closed position wherein the flexible cover is positioned in fully covering relation with respect to the interior space of the vehicle bed, (2) a fully open position wherein the flexible cover is fully collapsed to permit substantially full access to the interior space of the vehicle bed, and (3) at least one intermediate position wherein the flexible cover is positioned in partially covering relation with respect to the interior space of the vehicle thereby covering a portion of the interior space of the vehicle bed and permitting access to another portion of the interior space.

31. A cover assembly according to claim 26, wherein the first and second end portions of each of the support members include respective first and second sliding members secured thereto, the first and second sliding members being slidably mounted on respective first and second track members.

32. A cover assembly according to claim 26, further comprising a plurality of fold initiating mechanisms mounted between each pair of adjacent support members, each of the fold initiating mechanisms having a portion that engages an adjacent portion of the cover between an associated pair of adjacent support members so as to initiate folding of the adjacent portion in a predetermined direction as one of the associated pair of adjacent support members is being moved towards the other of the associated pair in the opening direction.

33. A cover assembly according to claim 32, wherein each fold initiating mechanism comprises:
   a flipper member pivotable upwardly to engage the adjacent portion of the cover so as to initiate folding of the adjacent portion in the predetermined direction; and
   a biasing member operatively connected to the flipper member to bias the flipper member upwardly.

34. A cover assembly according to claim 33, wherein each fold initiating mechanism comprises a pair of said flipper members and a pair of said biasing members.

35. A cover assembly according to claim 34, wherein each fold initiating mechanism comprises a transverse member extending between the pair of flipper members.

36. A cover assembly according to claim 35, wherein the flipper members are pivotally mounted to the support members.

37. A cover assembly according to claim 26, wherein the distal support member is adjacent the rear end wall when the cover is in a fully closed position,
   the distal support member providing a load transmitting surface and the first and second track members providing a load bearing surface that is engagable with the load transmitting surface, said load bearing and transmitting surfaces being positioned and configured such that when said distal support member is in said fully closed position the load transmitting surface engages the load bearing surface so that a tension force applied in the opening direction to the distal support member by the cover is transmitted to and borne by the load bearing surface of the track members thereby preventing the distal support member from movement in the opening direction.

38. A cover assembly according to claim 37, wherein the distal support member is pivotally mountable to the first and second track members respectively,
   wherein each of the first and second track members provide an arcuate path adjacent the rear end wall, the distal support member configured and positioned to pivot, when moved in the closing direction along the arcuate path, in a direction towards the rear end wall to the fully closed position with the load transmitting surface provided by the distal support member engaging the load bearing surface provided by the arcuate path of the track members.

39. A cover assembly for a vehicle bed having front and rear end walls, first and second side walls between the front and rear end walls, and a floor, the first and second side walls, the front and rear end walls, and the floor defining an interior space therebetween, the cover assembly comprising:
   first and second elongated track members, the first track member being mountable to the first side wall and the second track member being mountable to the second side wall;
   a plurality of transverse support members, each of the plurality of support members having first and second end portions, the first end portions being mountable on the first track member and the second end portions being mountable on the second track member to enable the support members to be moved in opposing opening and closing directions along the first and second track members, respectively;
   a flexible cover secured to each of the plurality of transverse support members,
   the support members being movably arranged on the first and second track members such that (1) movement of a distal one of the support members in the opening direction causes the distal support member to push each of the other support members in a sequential manner in the opening direction and hence sequentially collapses the cover secured thereto, thereby facilitating access to the interior space of the vehicle bed, and (2) movement of the distal support member in the closing direction causes the distal support member to pull the other support members in a sequential manner in the closing direction and hence sequentially moves the cover secured thereto into covering relation to the interior space of the vehicle bed, thereby inhibiting access to the interior space of the vehicle bed; and
   a motor operatively connected to the distal support member, the motor being activated to selectively move the distal end support member in the opening and closing directions,
   wherein the distal support member is adjacent the rear end wall when the cover is in a fully closed position,
   the distal support member providing a load transmitting surface and the first and second track members providing a load bearing surface that is engagable with the load transmitting surface, said load bearing and transmitting surfaces being positioned and configured such that when said distal support member is in said fully closed position the load transmitting surface engages the load bearing surface so that a tension force applied in the opening direction to the distal support member by the cover is transmitted to and borne by the load bearing surface of the track members thereby preventing the distal support member from movement in the opening direction.

40. A cover assembly according to claim 39, wherein the motor is a reversible motor including:
   a gear operatively connected to the motor, the motor being activatable to rotate the gear in opposing rotational directions;
   a drive cable conduit extending longitudinally along the first elongated track member, the drive cable conduit having a longitudinally extending slot; and a flexible drive cable received within the conduit and having a distal end portion connected to the distal one of the support members through the longitudinally extending slot to enable movement of the cable within the conduit to move the distal support member in the opening and closing directions, the cable being engaged with the gear in intermeshed relation such that (a) rotation of the gear by the motor in a first rotational direction pushes the cable in a distal direction within the conduit to push the distal support member in the closing direction and (b) rotation of the gear in a second rotation direction pulls the cable in a proximal direction within the conduit to pull the distal support member in the opening direction.

41. A cover assembly according to claim 40, wherein the motor includes a pair of reversible motor units, each motor unit having a gear and being activatable to rotate the gear in opposing rotational directions.

42. A cover assembly according to claim 40, further comprising a second drive cable received within a second cable conduit provided within the second track member, the first and second drive cables being engaged with the gear such that (a) rotation of the gear by the motor in a first rotational direction pushes the first and second cables in a distal direction within respective conduits to push the distal support member in the closing direction and (b) rotation of the gear in a second rotation direction pulls the first and second cables in a proximal direction within respective conduits to pull the distal support member in the opening direction.

43. A cover assembly according to claim 39, wherein the motor is operable to move the distal support member between (1) a fully closed position wherein the flexible cover is positioned in fully covering relation with respect to the interior space of the vehicle bed, (2) a fully open position wherein the flexible cover is fully collapsed to permit substantially full access to the interior space of the vehicle bed, and (3) at least one intermediate position wherein the flexible cover is positioned in partially covering relation with respect to the interior space of the vehicle thereby covering a portion of the interior space of the vehicle bed and permitting access to another portion of the interior space.

44. A cover assembly according to claim 39, wherein the first and second end portions of each of the support members include respective first and second sliding members secured thereto, the first and second sliding members being slidably mounted on respective first and second track members.

45. A cover assembly according to claim 39, further comprising a plurality of fold initiating mechanisms mounted between each pair of adjacent support members, each of the fold initiating mechanisms having a portion that engages an adjacent portion of the cover between an associated pair of adjacent support members so as to initiate folding of the adjacent portion in a predetermined direction as one of the associated pair of adjacent support members is being moved towards the other of the associated pair in the opening direction.

46. A cover assembly according to claim 45, wherein each fold initiating mechanism comprises:

a flipper member pivotable upwardly to engage the adjacent portion of the cover so as to initiate folding of the adjacent portion in the predetermined direction; and a biasing member operatively connected to the flipper member to bias the flipper member upwardly.

47. A cover assembly according to claim 46, wherein each fold initiating mechanism comprises a pair of said flipper members and a pair of said biasing members.

48. A cover assembly according to claim 47, wherein each fold initiating mechanism comprises a transverse member extending between the pair of flipper members.

49. A cover assembly according to claim 48, wherein the flipper members are pivotally mounted to the support members.

50. A cover assembly according to claim 39, further comprising a cover tensioner secured to a proximal end of the cover opposite the distal support member, the cover tensioner including a biasing member constructed and arranged to apply a tensioning force to the cover in a direction away from the distal support member to thereby maintain tension in the cover.

51. A cover assembly according to claim 39, wherein the distal support member is pivotally mountable to the first and second track members respectively, wherein each of the first and second track members provide an arcuate path adjacent the rear end wall, the distal support member configured and positioned to pivot, when moved in the closing direction along the arcuate path, in a direction towards the rear end wall to the fully closed position with the load transmitting surface provided by the distal support member engaging the load bearing surface provided by the arcuate path of the track members.

* * * * *

UNITED STATES PATENT AND TRADEMARK OFFICE
CERTIFICATE OF CORRECTION

PATENT NO. : 6,676,189 B2
DATED : January 13, 2004
INVENTOR(S) : Michael G Schall et al.

It is certified that error appears in the above-identified patent and that said Letters Patent is hereby corrected as shown below:

<u>Title page,</u>
Item [75], Inventors, replace "Daniel G. Beohmer, Krialling (DE)" with -- Daniel G. Boehmer, Krialling (DE) --.

Signed and Sealed this

Eighteenth Day of May, 2004

JON W. DUDAS
*Acting Director of the United States Patent and Trademark Office*